United States Patent [19]
Geiser et al.

[11] Patent Number: 5,906,293
[45] Date of Patent: *May 25, 1999

[54] METHOD AND APPARATUS FOR MAINTAINING UNIFORM MASS FLOW OF GRANULAR MATERIAL OUT OF A CONTAINER

[75] Inventors: Richard Lee Geiser, Goshen; Charles R. Bird, Milford, both of Ind.

[73] Assignee: CTB, Inc., Milford, Ind.

[*] Notice: This patent is subject to a terminal disclaimer.

[21] Appl. No.: 08/801,953

[22] Filed: Feb. 18, 1997

Related U.S. Application Data

[63] Continuation-in-part of application No. 08/373,787, Jan. 17, 1995, Pat. No. 5,603,359, which is a continuation-in-part of application No. 08/126,270, Sep. 24, 1993, Pat. No. 5,421,379.

[51] Int. Cl.$^6$ .................................................. B67D 5/06
[52] U.S. Cl. ........................... 222/1; 222/185.1; 222/156
[58] Field of Search ................ 141/286, 4, 98, 141/1; 414/288, 297–299; 239/672, 498, 500, 501, 518, 222.15, 222.17, 687, 681; 52/82, 94–96, 192–197; 366/347, 9; 222/1, 185.1, 413, 460, 462, 156

[56] References Cited

U.S. PATENT DOCUMENTS

| | | |
|---|---|---|
| 1,047,755 | 12/1912 | Craig . |
| 1,615,878 | 2/1927 | Laird . |
| 3,223,290 | 12/1965 | Schuld ................................. 222/185.1 |
| 3,349,929 | 10/1967 | Berger . |
| 3,488,007 | 1/1970 | Nevenschwander . |
| 3,664,072 | 5/1972 | Lieckfeld . |
| 3,682,394 | 8/1972 | Shivers . |
| 3,733,764 | 5/1973 | Hege . |
| 3,791,592 | 2/1974 | Cobb . |
| 3,880,300 | 4/1975 | Uhl . |
| 3,961,660 | 6/1976 | Vinci . |
| 4,112,634 | 9/1978 | Bissinger . |
| 4,208,839 | 6/1980 | Candy, Sr. . |
| 4,267,936 | 5/1981 | Pavlicek . |
| 4,327,522 | 5/1982 | Meadows . |
| 4,424,837 | 1/1984 | Farrell . |
| 4,433,707 | 2/1984 | Farnham . |
| 4,598,496 | 7/1986 | Van Daele . |
| 4,625,888 | 12/1986 | Thompson . |
| 4,700,893 | 10/1987 | Bugler, III . |
| 4,802,609 | 2/1989 | Morse et al. ............................ 222/413 |
| 4,867,046 | 9/1989 | Yoder . |
| 4,930,446 | 6/1990 | Huisinga . |
| 4,938,391 | 7/1990 | Grundler ................................. 222/413 |
| 4,972,884 | 11/1990 | Sovers et al. . |
| 5,158,502 | 10/1992 | Frost . |
| 5,238,035 | 8/1993 | Poussin et al. . |
| 5,280,813 | 1/1994 | Jackson . |
| 5,421,379 | 6/1995 | Geiser ........................................ 141/1 |
| 5,603,359 | 2/1997 | Geiser ...................................... 141/98 |

FOREIGN PATENT DOCUMENTS 254174  11/1962  Australia .

OTHER PUBLICATIONS

Brochure entitled "GrandHandlers: Low Cost Drying Systems", Sukup Grain Handlers (no date).
Brochure entitled "Spread–All Complete Offering of Grain Spreaders", Spread–All Mfg. Co. (no date).

*Primary Examiner*—Steven O. Douglas
*Attorney, Agent, or Firm*—Harness, Dickey & Pierce, P.L.C.

[57] ABSTRACT

A method and apparatus for maintaining a substantially uniform mass flow of granular material out of a container. The apparatus includes a converging transition portion defining an input opening which converges to an output opening. The output opening has a transverse opening dimension (x). An elongated chimney portion is coupled to the converging transition portion at the output opening. The elongated chimney portion has a height dimension (y) The ratio of the transverse opening dimension (x) relative to the height dimension (y) is determined by an angle of repose of the granular material to maintain a substantially uniform mass flow of granular material.

23 Claims, 13 Drawing Sheets

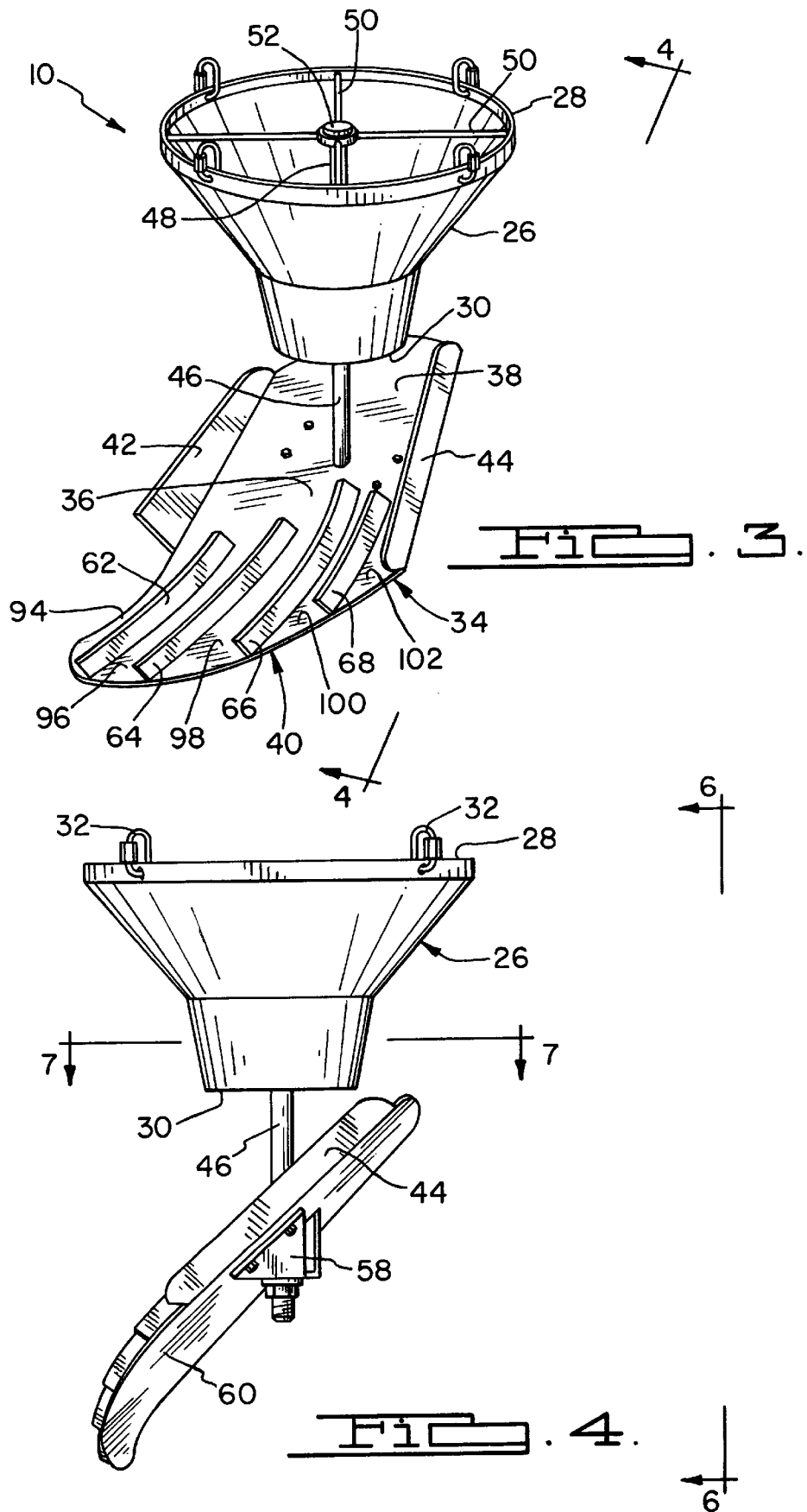

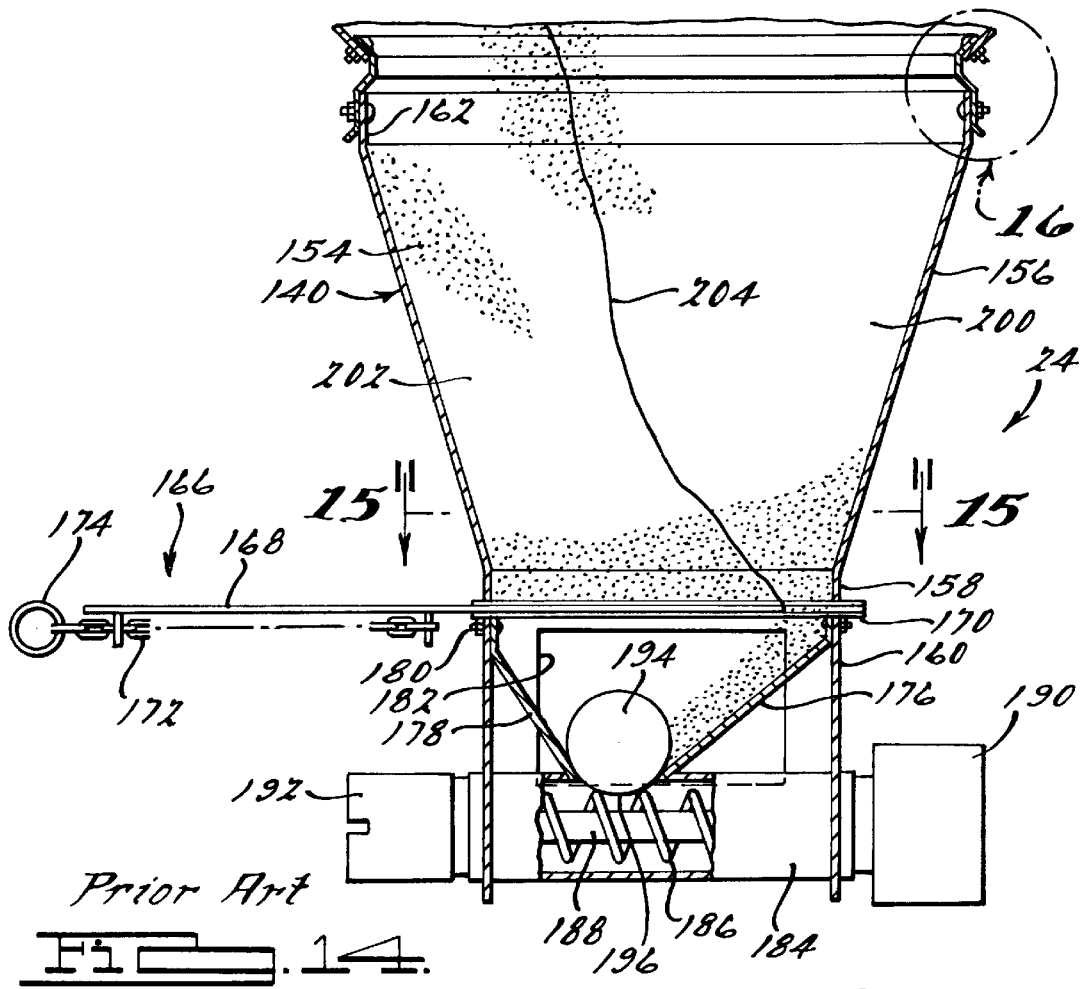
Prior Art
FIG. 14.
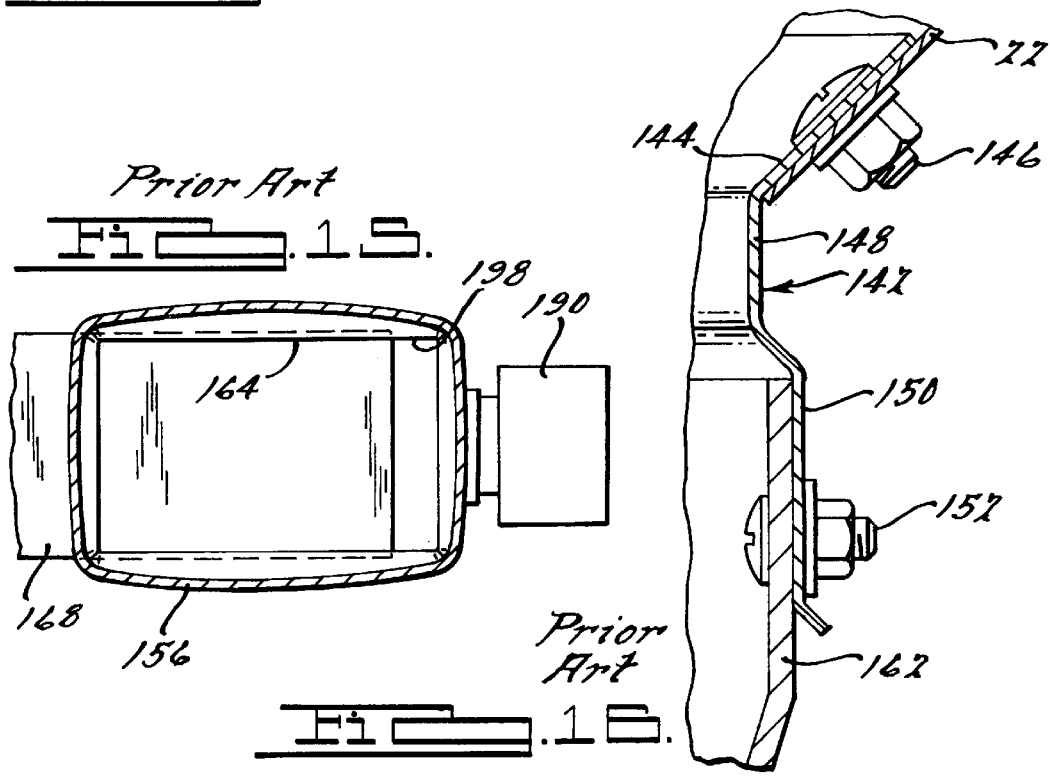
Prior Art
FIG. 15.
Prior Art
FIG. 16.

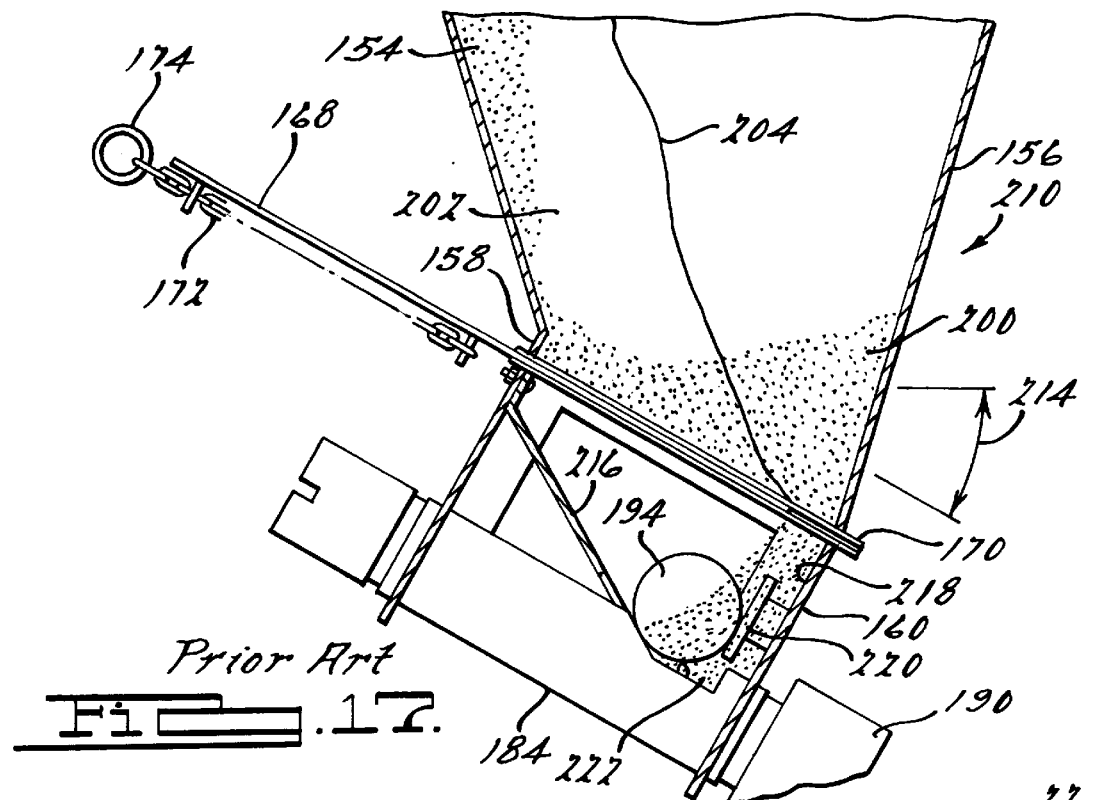
Fig. 17. Prior Art
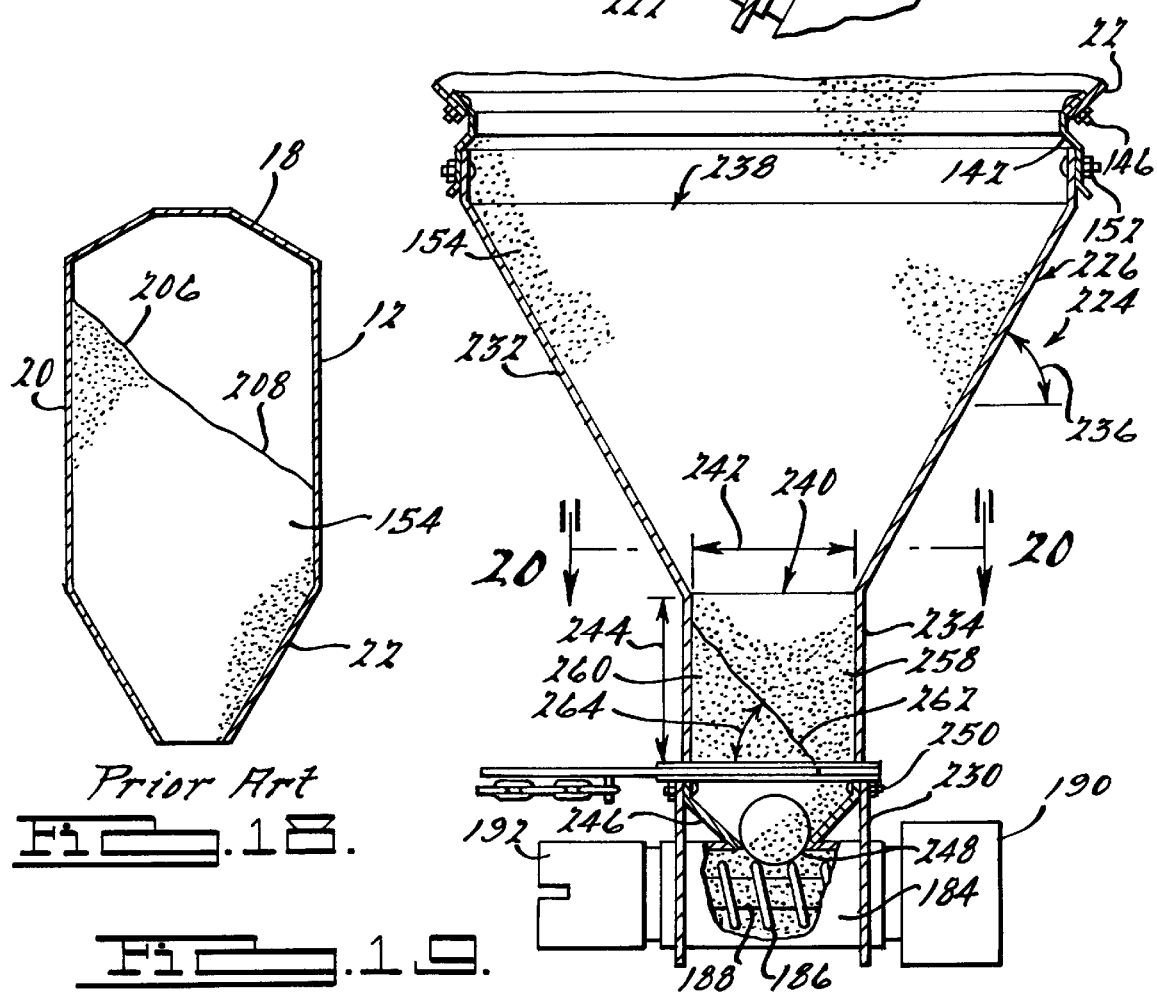
Fig. 18. Prior Art
Fig. 19.

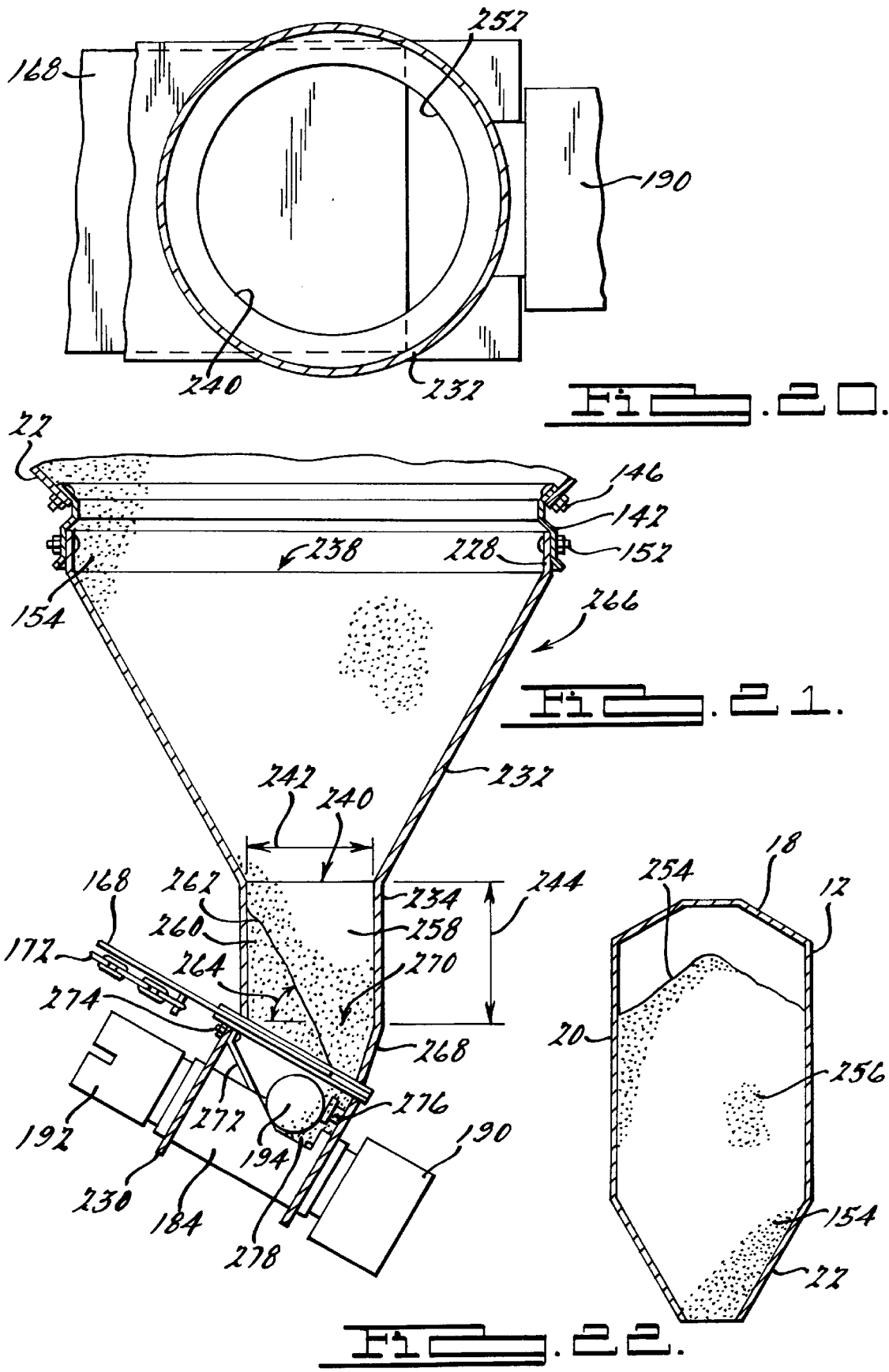

5,906,293

METHOD AND APPARATUS FOR MAINTAINING UNIFORM MASS FLOW OF GRANULAR MATERIAL OUT OF A CONTAINER

CROSS-REFERENCE TO RELATED APPLICATIONS

This application is a continuation-in-part application of U.S. Ser. No. 08/373,787, entitled "METHOD AND APPARATUS FOR STORING MATERIAL WITHIN A CONTAINER WHICH IS EXPOSED TO RAIN", filed on Jan. 17, 1995, which is now U.S. Pat. No. 5,603,359, which is a continuation-in-part application of U.S. Ser. No. 08/126,270, entitled "METHOD AND APPARATUS FOR DISTRIBUTING GRANULAR MATERIAL WITHIN A CONTAINER", filed on Sep. 24, 1993, now U.S. Pat. No. 5,421,379, issued Jun. 6, 1995.

BACKGROUND OF THE INVENTION

1. Field of the Invention

This invention relates generally to the storage of granular material such as animal feed, and more particularly, to a method and apparatus for maintaining uniform mass flow of granular material out of a container.

2. Description of the Related Art

In various industries such as those involving agriculture and manufacturing, it is often necessary to store relatively large amounts of granular material. In agriculture, for example, it is often necessary to store substantial quantities of feed for animal husbandry operations. When used in such industries, the granular material is often initially loaded into an opening located at the top of a container which is used for temporary storage of the granular material. The granular material is then later removed from the container immediately prior to use through an opening located at the bottom of a funnel-shaped portion of the container.

Depending on the nature of the granular material that is being stored, there are often difficulties associated with using such containers. For example, granular material may often include a number of different constituents which tend to separate when loaded into a container. For example, feed for chickens generally includes a fine constituent which tends to be located in the center of the container while the container is being loaded, as well as a coarse constituent which tends to be located near the walls of the container when the container is being loaded. Because the constituents separate in this manner when they are loaded into the container, it is not generally possible to remove the granular material from the container with the same proportion of constituents as was present when the granular material was loaded into the container. In animal husbandry operations, this separation of the constituents of the feed may typically cause lower productivity. Accordingly, there is a need for substantially uniformly distributing the constituents of the granular material within the container.

In addition, granular material which is loaded into a container may not be evenly distributed within the container in that there may be a large variation in the height of the granular material around the uppermost region of the container. Not only does this reduce the effective storage capacity of the container, but the areas within the container which are not filled with granular material allow moisture to accumulate which tends to cause the granular material to degrade to various processes such as by the formation of mold. Accordingly, there is also a need for substantially evenly distributing the granular material within the container.

Moreover, granular material which is stored in the container may tend to absorb moisture at the lower funnel-shaped portion of the container during a rainfall. This generally occurs because the funnel-shaped portion of the container converges at an outlet portion and the flow of rain is thus routed directly to the outlet portion along the sides of the container. Again, this condition degrades the granular material, as well as clogs up the outlet portion. Accordingly, there is an additional need to divert the flow of rain away from the lower funnel-shaped portion of the container to maintain the lower funnel-shaped portion of the container in a substantially dry condition during a rainfall.

Still further, as the granular material is removed from the container at the lower outlet portion using a conventional boot and auger assembly, the granular material tends to unload unevenly and have a non-uniform mass flow. In worst case conditions, a side unloading condition may occur within the container, where the granular material is generally flowing out of the container more along one side of the container causing the slower flowing granular material to concentrate along a higher wall. This uneven distribution of granular material within the container may result in collar warpage or damage along the lower outlet portion and, in extreme circumstances, panels along the lower funnel shaped portion may split and give way under the uneven loading of the granular material. Furthermore, this type of unloading may also cause what is known as "bridging" of the granular material within the container where pockets or portions of the granular material are removed leaving a subsequent bridge of granular material which, over time, may fall or "feed crash" within the container, further causing potential structural problems to the container.

Various methods and devices have been developed in an effort to distribute granular material entering a container. As shown in FIG. 1, one particular type of device, generally known as a spreader, has been used for distributing grain within a grain bin. Such a spreader is typically located at the upper region of the grain bin and includes a slide which is rotated by a motor. As the granular material is delivered to the slide, the granular material flowing along the slide is distributed at various locations within the grain bin.

While such a spreader has been used generally successfully in distributing grain within a grain bin, there are nevertheless several disadvantages associated with such a spreader. For example, the use of a motor to rotate the slide necessarily increases the cost of the spreader. In addition, the use of a motor to rotate the slide tends to make the operation of the spreader susceptible to motor failure and therefore less reliable. Furthermore, it is not generally easy to determine whether or not the motor driving the slide has indeed failed thereby causing the slide not to rotate because the slide and the motor are generally hidden from view. Finally, such a spreader has generally only been associated with the distribution of grains in grain bins and has not generally been used to distribute animal feed in feed bins.

SUMMARY OF THE INVENTION

In one embodiment, the present invention relates to an apparatus for maintaining a substantially uniform mass flow of granular material out of a container. The apparatus includes a converging transition portion defining an input opening which converges to an output opening. The output opening has a transverse opening dimension (x). An elongated chimney portion is coupled to the converging transition portion at the output opening. The elongated chimney portion has a height dimension (y). The ratio of the transverse opening dimension (x) relative to the height dimension (y) is determined by an angle of repose of the granular material to maintain a substantially uniform mass flow of the granular material.

Accordingly, it is a general object of the invention to provide a method and apparatus for distributing granular material within a container in which the constituents of the granular material are substantially uniformly distributed.

A further object of the present invention is to provide a method and apparatus for distributing granular material within a container in which the level of the granular material in the container is substantially even as the container is being filled.

Another object of the present invention is to provide a method and apparatus for distributing granular material within a container which is able to distribute the granular material by absorbing momentum from the inflow of the granular material.

A further related object of the present invention is to provide a method and apparatus for distributing granular material within a container which is able to reduce the amount of mold which may form on the granular material which is stored in a container.

A related object of the present invention is to provide a method and apparatus for distributing granular material within a container which is able to effectively increase the amount of granular material which is stored within a container.

Another object of the present invention is to provide a method and apparatus for distributing granular material within a container which is relatively simple and low in cost, yet is reliably able to distribute granular material within a container.

Yet another object of the present invention is to provide a method and apparatus for diverting the flow of rain away from the funnel-shaped portion of the container during a rainfall.

Still another object of the present invention is to provide a method and apparatus for maintaining uniform mass flow of granular material out of the container, thereby eliminating side unloading of the granular material, "bridging" of the granular material, and potential structural damage to the container due to such unloading conditions.

BRIEF DESCRIPTION OF THE DRAWINGS

The features of the present invention which are believed to be novel are set forth with particularity in the appending claims. The organization and manner of operation of the invention, together with the further objects and advantages thereof, may best be understood by reference to the following description taken in conjunction with the accompanying drawings, in which identical reference numerals identify similar elements, and in which:

FIG. 3 is a perspective view of the apparatus for distributing granular material as shown in FIG. 2 according to the teachings of one preferred embodiment of the present invention;

FIG. 4 is a side elevational view of the apparatus for distributing granular material according to the teachings of one preferred embodiment of the present invention taken along lines 4—4 in FIG. 3;

FIG. 14 is a side cross-sectional view of a lower outlet portion of container for storing granular material of the type which is known in the prior art;

FIG. 15 is a sectional view of the lower outlet portion as shown in FIG. 14 taken along line 15—15 in FIG. 14;

FIG. 16 is an enlarged cross-sectional view of the lower outlet portion as shown in FIG. 14 taken about line 16 in FIG. 14;

FIG. 17 is a side cross-sectional view of a lower outlet portion of a container for storing granular material of another type which is known in the prior art;

FIG. 18 is a side cross-sectional view of a container displaying the flow pattern achieved with the lower outlet portions shown in FIGS. 14 and 17;

FIG. 19 is a side cross-sectional view of an apparatus for maintaining uniform mass flow of granular material out of a container according to the teachings of one preferred embodiment of the present invention;

FIG. 20 is a sectional view of the apparatus for maintaining uniform mass flow as shown in FIG. 19 taken along line 20—20 in FIG. 19;

FIG. 21 is a side cross-sectional view of an apparatus for maintaining uniform mass flow of granular material out of a container according to the teachings of another preferred embodiment of the present invention; and FIG. 22 is a side cross-sectional view of a container displaying the flow pattern achieved with the apparatuses for maintaining uniform mass flow as shown in FIGS. 19 and 21.

DESCRIPTION OF THE PREFERRED EMBODIMENTS

The following discussion of the preferred embodiments of the present invention is merely exemplary in nature.

Accordingly, this discussion is in no way intended to limit the scope of the invention, application of the invention, or the uses of the invention.

Figure 1:
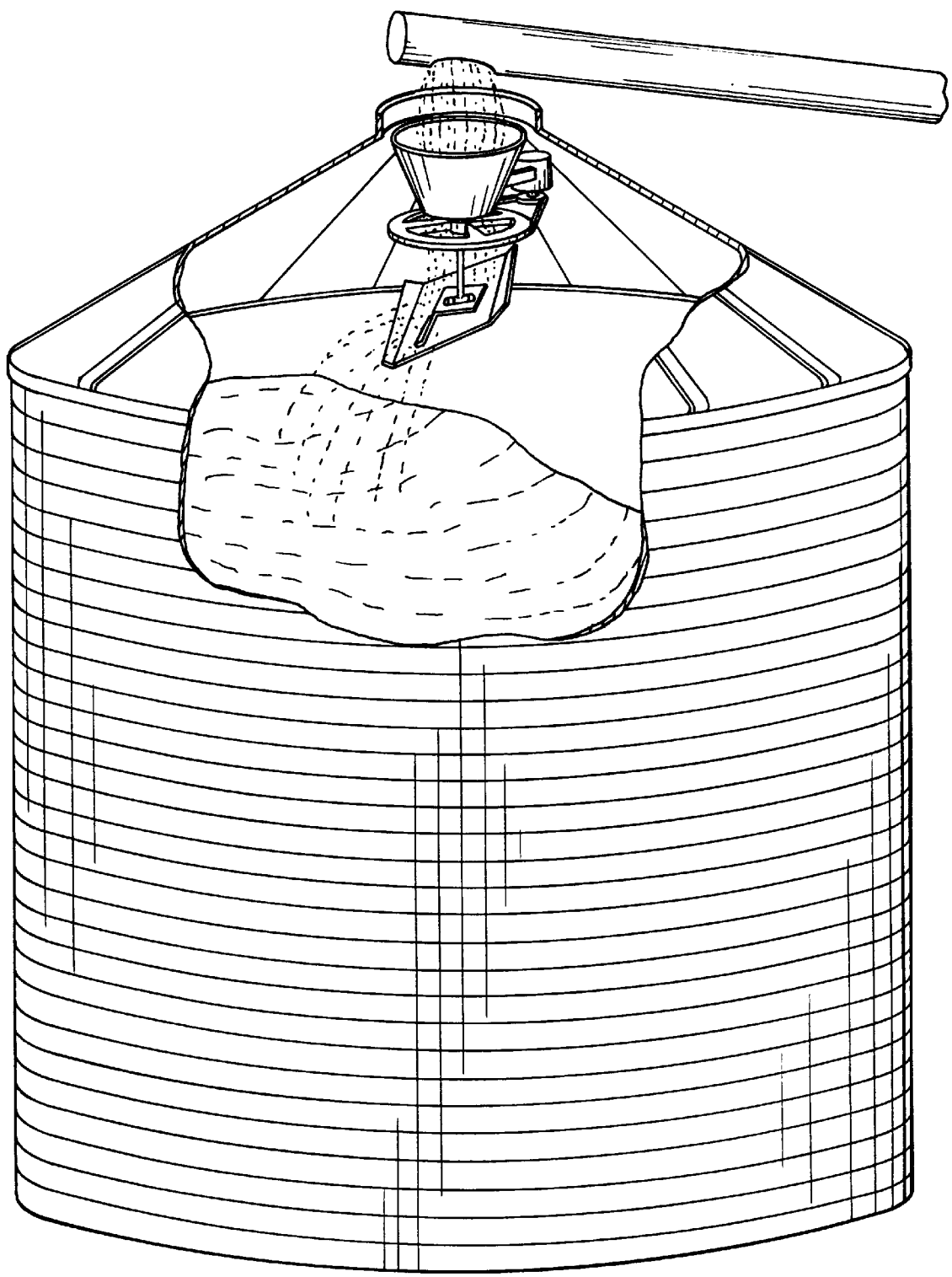
FIG. 1 is a perspective view, partially broken away, of a container for storing granular material of the type which is known in the prior art.
Figure 2:
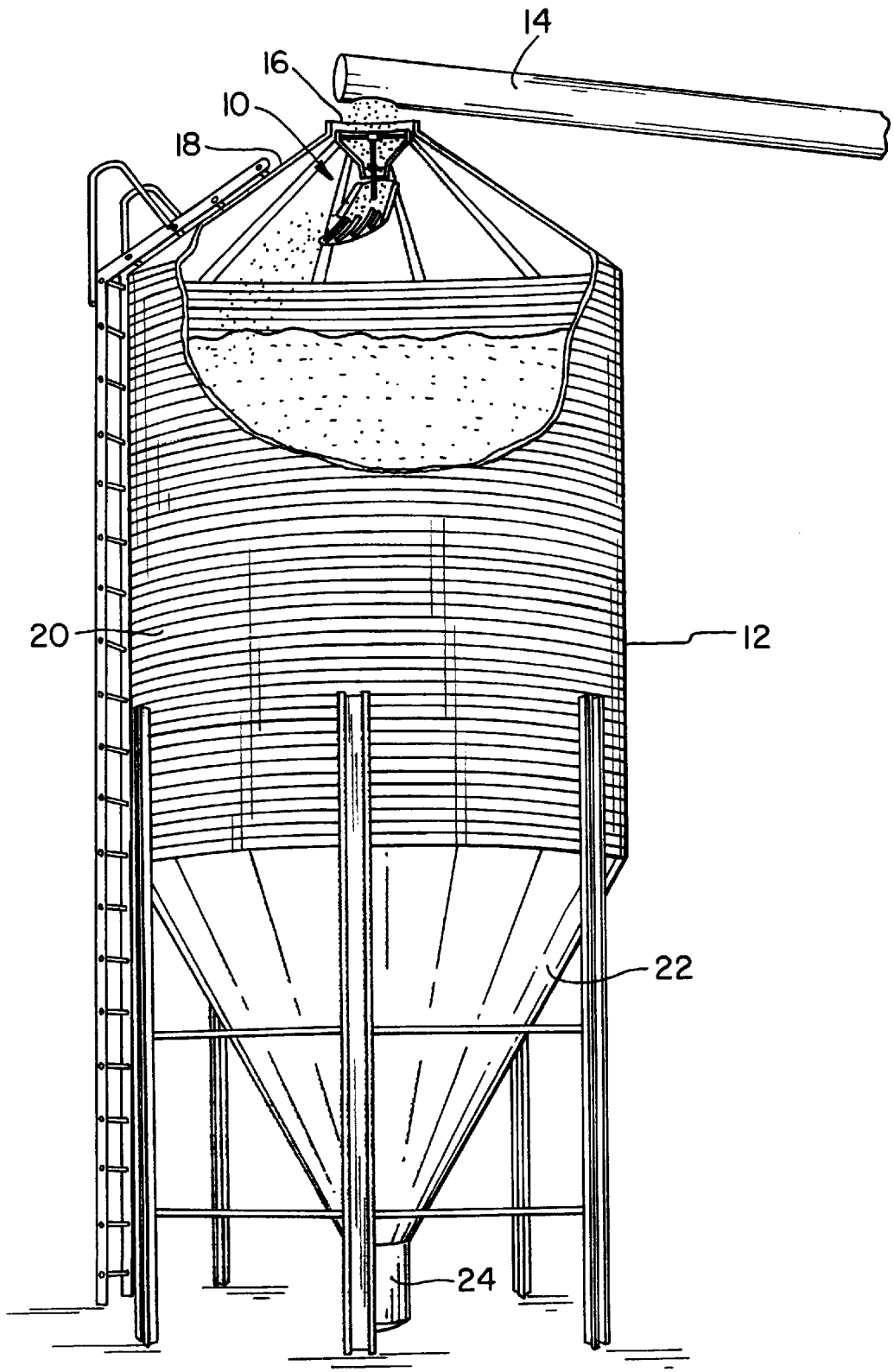
FIG. 2. is a perspective view, partially broken away, of a container having an apparatus for distributing granular material according to the teachings of one preferred embodiment of the present invention.

Referring now to FIG. 2, an apparatus 10 for distributing a granular material is shown. The apparatus 10 may be used to distribute grains, feed or food products or other bulk materials for use in agricultural or industrial use. The granular material may, but not necessarily, be formed from two or more constituents which may have a tendency to separate when being stored. The apparatus 10 is shown in operative association with a container 12 which is used for storing the granular material. The container 12 receives an inflow of granular material from a dispensing device 14 such as an auger or a downspout. In this regard, the granular material enters the lower portion (not shown) of the dispensing device 14 and delivers the granular material to the open end 16 of the container 12. As will be appreciated by those skilled in the art, the inflow of granular material from the dispensing device 14 to the container 12 has a given momentum in that the granular material has both velocity and mass.

The container 12 includes an upper cover portion 18 which is used to cover the granular material within the container 12. The cover portion 18 may include a lid and corresponding opening device (not shown) which is disclosed in U.S. Pat. No. 4,744,183, which is hereby incorporated by reference. The container 12 further includes a generally circular sidewall portion 20 which is used for containing the granular material received by the container 12. In addition, the container 12 includes a lower funnel-shaped portion 22 which is used for guiding the granular material downward into a lower outlet portion 24. As those skilled in the art will appreciate, the lower outlet portion 24 permits removal of the granular material from the container 12 by any suited means such as that which is disclosed in U.S. Pat. No. 4,640,230, which is hereby incorporated by reference.

Preferably, the cover portion 18 is generally conical in shape and has an angle of inclination which is substantially equal to the angle of repose of the granular material. For example, if the granular material is chicken feed which has an angle of repose of approximately 40°, then the angle of inclination of the cover portion 18 is preferably also approximately 40°. Because the angle of inclination of the cover portion 18 is relatively large, a greater amount of granular material can be stored in the container 12. This is because the volume of the container 12 defined by the walls of the cover portion 18 is larger than when the angle of inclination of the cover portion 18 is lower. In addition, by having the angle of inclination of the cover portion 18 not greater than the angle of repose of the granular material, the space or void created between the granular material and the inner surface of the cover portion 18 is minimized. It will be appreciated that the presence of these spaces or voids may otherwise tend to cause the granular material to degrade such as by the formation of mold.

As will be appreciated by those skilled in the art, the container 12 may be a feed storage bin of the type which is available from Chore-Time or Brock, Milford, Indiana. However, it will be understood that the present invention may be used with other types of containers as well as used for distributing other types of granular materials. In this regard, the container 12 may be used for storing other types of agricultural materials, consumable materials, industrial materials, chemical materials as well as virtually any other type of granular material. In addition, while the container 12 is shown as being generally cylindrical in shape with a conically-shaped cover portion 18, the container 12 may be of virtually any other shape which is suitable for storing the granular material. Accordingly, the container may be rectangular, hexagonal, octagonal or any other suitable shape.

The apparatus 10 will now be more fully described with reference to FIGS. 3–7. The apparatus 10 comprises a conical member 26 which has an upper portion 28 which is operable to receive the inflow of granular material from the dispensing device 14. In addition, the conical member 26 has a lower portion 30 which is able to deliver the inflow of granular material to a base member which is more fully described below. The conical member 26 serves to concentrate the inflow of granular material received from the dispensing device 14 and direct the inflow to the base member.

Preferably, the outside diameter of the upper end of the upper portion 28 is about 21 inches, while the inside diameter of the lower end of the lower portion 30 is approximately 8 inches. The height of the conical member 26 is preferably about 12.5 inches. The walls of the upper portion 28 are angled at approximately 40° from vertical, while the walls of the lower portion 30 extend approximately 11° from vertical. The upper portion 28 of the conical member 26 meets the lower portion 30 of the conical member 26 at a point where the inside diameter of the conical member 28 is approximately 10 inches. The upper end of the upper portion 28 includes a 1 inch flat on the upper surface of the conical member 26 so as to provide a region for engaging the mechanical linkages which are described below. It will be appreciated that the conical member 26 may be of other suitable shapes. In addition, while the conical member 26 may preferably be made from 16 gauge galvanized steel, any other suitable materials may be used. Such materials would include polymeric based materials.

The conical member 26 is mechanically connected to the region of the cover portion 18 which is proximate to the open end 16 of the container 12. To provide this mechanical connection, the conical member 26 includes a plurality of mechanical linkages 32 which may be used to removably secure the conical member 26 to the container 12. The mechanical linkages 32 also provide means for changing the position of the base member 46 in response to the height of the granular material within the container 12. In this regard, the mechanical linkages 32 are operable to permit limited rotational movement of the apparatus 10 as the level of the granular material in the container 12 increases to where the granular material contacts the apparatus 10. This limited rotational movement of the apparatus 10 permitted by the mechanical linkages 32 serves to limit damage to the apparatus 10 which may otherwise be caused as the level of the granular material in the container 12 increases and contacts the apparatus 10. While the mechanical linkages 32 made may preferably be chain linkages and/or quick linkages, any other suitable means for securing the conical member 26 to the container 12 may be used. For example, the mechanical linkages 32 may be cables, or any other suitable type of metallic or polymeric fasteners.

To provide means for distributing the granular material within the container 12, the apparatus 10 further includes a base member 34. The base member 34 receives the inflow of the granular material from the conical member 26 and distributes the constituents of the granular material in a substantially uniform manner within the container 12. As a result, the constituents of the granular material are distributed within the container 12 such that the constituents are able to be withdrawn from the container 12 in substantially the same proportion as they were initially delivered to the container 12. For example, in the case of feed for chickens in which the granular material includes both a coarse constituent and a fine constituent, both the coarse and fine constituents are distributed substantially uniformly within the container 12. The fine and coarse constituents are therefore able to be withdrawn from the container 12 so as to provide a uniform source of feed.

In addition, the base member 34 also serves to substantially evenly distribute the granular material within the container. In this regard, the variation in the height of granular material within the container 12 is relatively low. Because the granular material is substantially evenly distributed within the container, the effective storage capacity of the container 12 is increased. In addition, spaces within the container 12 which are not filled with the granular material are minimized which would otherwise allow moisture to accumulate and therefore degrade the granular material such as by the formation of mold.

The base member 34 includes a generally quadrilateral channel or central portion 36 as well as an upper end portion 38 which is generally symmetrically curvilinear in shape and a lower end portion 40 which is generally asymmetrically curvilinear in shape. As will be more fully described below, granular material which is delivered to the base member 34 from the conical member 26 is received by the central portion 36 and then flows along the central portion 36 as well as the lower end portion 40. When the granular material reaches the edge of the lower end portion 40, the granular material falls away from the base member 34 and is substantially evenly distributed into the container 12. The base member 34 further includes a first sidewall member 42 as well as a second sidewall member 44. The first and second sidewall members 42 and 44 are operable to guide the flow of granular material along the central portion 36 to the lower end portion 40 of the base member 34 and prevent the granular material from falling laterally off the sides of the base member 34. The sidewall member 42 is roughly triangular in shape in that the upper region of the sidewall member 42 extends approximately 2 inches from the central portion 36 of the base member 34 while the lower portion of the sidewall member 42 extends approximately 3.6 inches from the central portion 36 of the base member 34. In addition, the second sidewall member 44 is roughly rectangular in shape and extends approximately 2.4 inches upward with respect to the central portion 36 of the base member 34.

To provide means for supporting the base member 34 within the container 12, the apparatus 10 further includes a base support member 46. The base support member 46 extends vertically downward from the conical member 26 to the base member 34. The upper portion 48 of the base support member 46 is secured to the upper portion 28 of the conical member 26 by a first plurality of support members 50. Each of the first plurality of support members 50 mechanically communicates both with a first bearing member 52 and with the upper portion 28 of the conical member 26. In a similar fashion, the base support member 46 is also supported with respect to the lower portion 30 of the conical member 26 by a second plurality of support members 54. The second plurality of support members 54 extend between a second bearing member 56 and a lower portion 30 of the conical member 26. The first and second bearing members 52 and 56 serve to permit relative rotation between the base support member 46 and the conical member 26. In addition, the first and second plurality of support members 50 and 54 serve to direct the flow of granular material within the conical member 26 by limiting rotational movement of the inflow of granular material as the granular material is received by the conical member 26.

To provide means for supporting the base member 32 with respect to the base support member 46, the apparatus 10 further includes a bearing block assembly 58. The bearing block assembly 58 is disposed on the lower surface 60 of the base member 34 and is secured thereto by suitable fasteners such as bolts. In addition, the bearing block assembly 58 also is secured to the lower portion of the base support member 46. It will be appreciated that the bearing block assembly 58 may be of any suitable construction which is capable of supporting the base member 34 with respect to the base support member 46.

Figure 6:
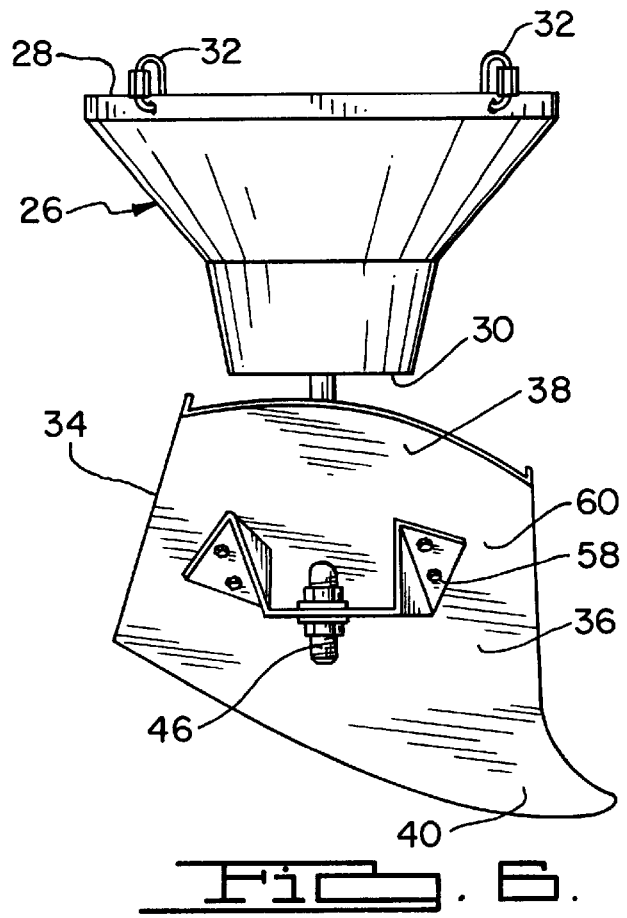
FIG. 6 is a side elevational view of the apparatus for distributing granular material according to the teachings of one preferred embodiment of the present invention taken along lines 6—6 in FIG. 4.
Figure 7:
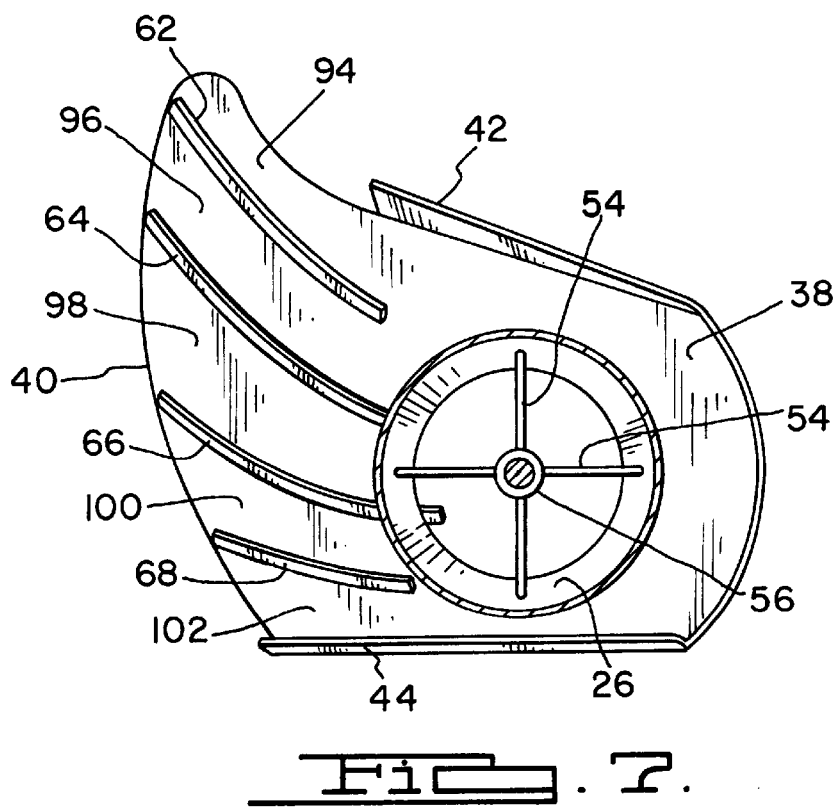
FIG. 7 is a top elevational view of the apparatus for distributing granular material according to the teachings of one preferred embodiment of the present invention taken along line 7—7 in FIG. 4.

The base member 34 is canted with respect to the base support member 46 so as to allow the inflow of granular material to slide along the base member 34 in a direction generally towards the lower lefthand portion of the base member 34 as shown in FIG. 3. In this regard, the base member 34 is canted at an angle of approximately 40–45° with respect to the base support member 46 when viewed in the manner shown in FIG. 4. In addition, the base member 34 is canted by approximately 5° with respect to base support member 46 when viewed as shown in FIG. 6.

To provide means for forming a plurality of flow paths for the granular material, the base member 34 further includes a plurality of vanes 62–68. The vanes 62–68 serve to absorb momentum from the inflow of granular material in such a manner as to rotate the base member 34 at a substantially constant angular velocity as will be more fully described below. By rotating the base member 34 at a substantially constant angular velocity, the distribution of granular material within the container 12 is substantially even. In this regard, the variation in the height of the granular material within the container 12 across the upper surface of the granular material is substantially within 18 inches while the granular material is being loaded into the container 12.

The vanes 62–68 are disposed on the central portion 36 as well as on the lower end portion 40 of the base member 34 and are of different lengths and shapes. In this regard, the first end 70 of the vane 62 is disposed further from the base support member 46 than the first end 72 of the vane 64. In a similar fashion, the first end 72 of the vane 64 is disposed further from the base support member 46 than the first end 74 of the vane 66. However, the first end 76 of the vane 68 is disposed further from the base support member 46 than the first end 74 of the vane 66. The second ends 78–84 of each of the vanes 62–68 are disposed proximate to the edge of the lower end portion 40 of the base member 34. The vanes 62–68 are secured to the base member 34 by means of a plurality of tabs (not shown) which extend through the central portion 36 and the lower end portion 40 of the base member 34 and are then twisted to provide interfering engagement therewith. In this regard, each of the vanes 62–68 have a tab located at their upper end as well as approximately at their midportions which are operable to be inserted through corresponding slots (not shown) in the base member 34. The lower portions of the vanes 62–68 are not secured to the lower end portion 40 of the base member 34 so as to permit the vanes 62–68 to be manually shaped if necessary to provide proper operation.

The lengths and the shapes of the vanes are selected so that the momentum absorbed by the vanes 62–68 from the inflow of granular material will cause the base member 34 to rotate at a substantially constant angular velocity. With respect to length, it will be noted that the vane 62 is longer than the vane 64, while the vane 64 is longer than the vane 66. In addition, the vane 66 is longer than the vane 68. Preferably, the vane 62 is 11.8 inches in length, while the vane 64 is approximately 12.6 inches in length. The vane 66 is 12.2 inches in length, while the vane 68 is approximately 8 inches in length. It will be appreciated, however, that other suitable lengths may be used which provide substantially the same results as that which is described herein.

With respect to the shape, each of the vanes 62–68 has a corresponding arcuate portions 86–92 which define a concave surface as well as a convex surface. The curvature of the arcuate portions 86–92 for each of the vanes 62–68 is different. Preferably, the arcuate portion 86 of the vane 62 is formed by sweeping an arc of 28.1° at a radius of 24 inches. In a similar fashion, the arcuate portion 88 of the vane 64 is formed by a sweeping an arc of 30.0° at a radius of approximately 24.0 inches. In addition, the arcuate portion 90 of the vane 66 is formed by sweeping an arc of 43.6° at a radius of 16.0°, while the arcuate portion 92 of the vane 68 is formed by sweeping an arc of approximately 19.1° at a radius of approximately 24.0 inches. However, the arcuate portions 86–92 may be of other shapes so long as the vanes 62–68 function in a manner similar to that described herein.

Figure 5:
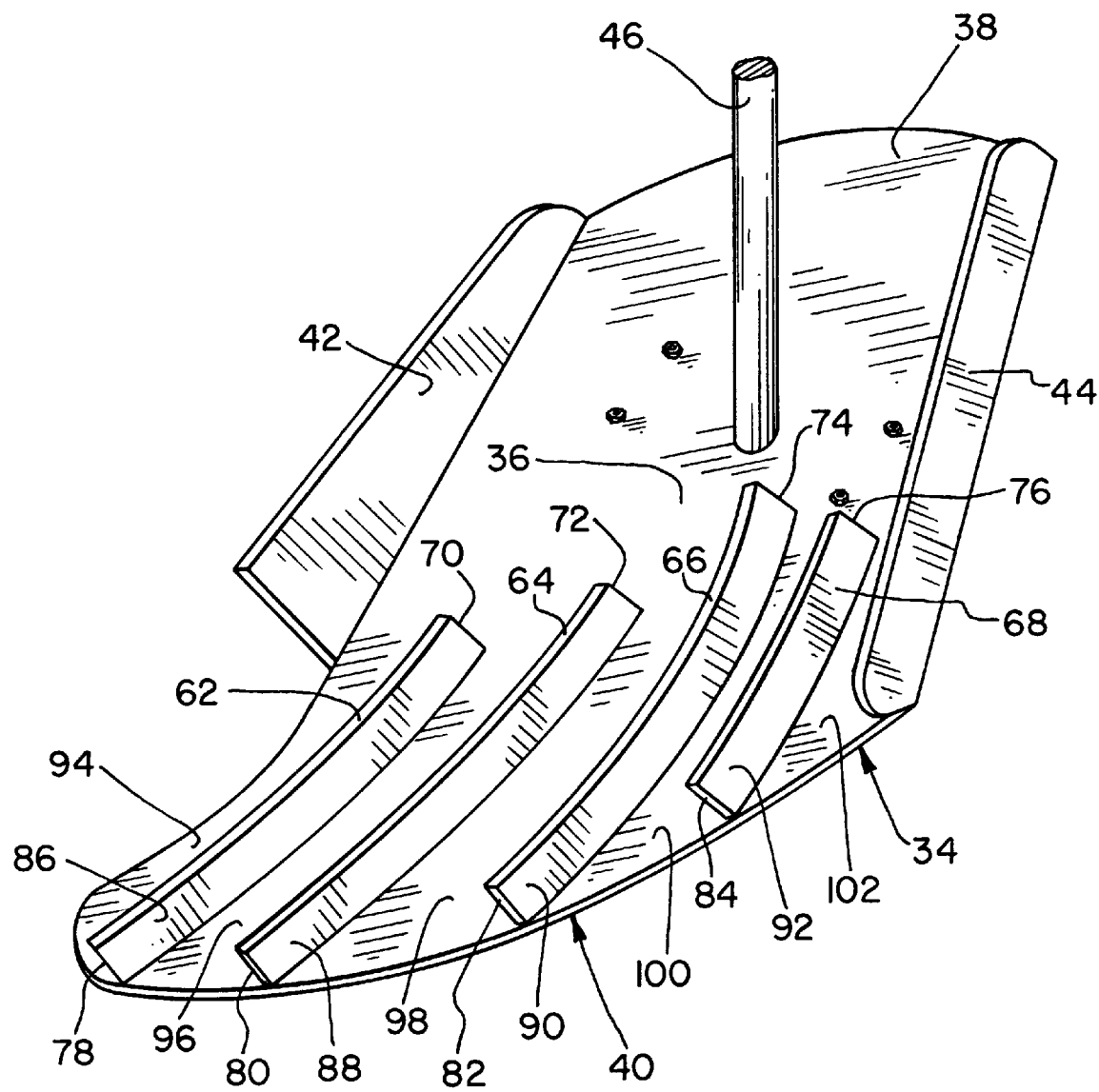
FIG. 5 is an enlarged perspective view of the base member shown in FIG. 3 of the apparatus for distributing granular material according to the teachings of one preferred embodiment of the present invention.

The vanes 62–68 are operable to form a plurality of flow paths 94–102 for the granular material received by the base member 34. In this regard, the flow path 94 is formed between the first sidewall member 42 of the base member 34 and the vane 62. In a similar fashion, the flow path 96 is formed between the vane 62 and the vane 64, while the flow path 98 is formed between the vane 64 and the vane 66. In addition, the flow path 100 is formed between the vane 66 and the vane 68, while the flow path 102 is formed between the vane 68 and the right most edge of the base member 34 as shown in FIG. 5. The amount of granular material flowing through the flow paths 94–102 will vary depending on the rotational position of the base member 34. That is, the amount of granular material flowing through each of the flow paths 94–102 will vary as the base member 34 rotates.

To permit the base member 34 to distribute the granular material in a substantially even fashion within the container 12, it is important that the base member 34 rotate at a substantially constant angular velocity. There are generally three factors which affect the angular velocity at which the base member 34 rotates. These factors are (a) the amount of granular material flowing through each of the flow paths 94–102, (b) the extent to which the vanes 62–68 deflect the flow of granular material and therefore absorb the momentum of the granular material, and (c) the extent to which the flow of granular material is deflected by the sidewall member 42 of the base member 34 and therefore absorbs momentum. The structure of the vanes 62–68 causes these factors to be balanced in such a manner as to allow the base member 34 to rotate at a substantially constant angular velocity. The balancing of these factors is particularly difficult given the fact that the flow of granular material from the conical member 26 onto the base member 34 is generally uneven. This is because the inflow of granular material to the conical member 26 is not typically directed to the center of the conical member 26, but is typically directed to the sides of the conical member 26.

The manner in which the vanes 62–68 serve to balance these factors to cause the base member to rotate at a substantially constant angular velocity is illustrated in FIGS. 8 (A)–(F). Region A as shown in FIGS. 8 (A)–(F) represents an area where the amount of granular material flowing from the conical member 26 to the base member 34 is relatively low, while the region B represents an area on the base member 34 where the amount of granular material flowing from the conical member 26 to the base member 34 is relatively high. In addition, the arrows shown in FIGS. 8 (A)–(F) which extend from region B of the base member 34 serve to indicate the direction of flow of granular material from region B along the base member 34. While the inflow of granular material received by the base member 34 has generally been divided into two regions, it will be understood that this representation has been used for purposes of simplifying this discussion.

When the base member 34 is oriented in the position shown in FIG. 8 (A), the amount of granular material flowing through each of the flow paths 94–102 is approximately the same. The momentum which is absorbed by the vanes 62–68 which tends to cause the base member 34 to rotate in a counterclockwise direction is therefore primarily the result of the deflection of the granular material which is deflected by the concave surfaces of the vanes 62–68. The flow of granular material acting on the convex surfaces of the vanes 62–68 is relatively low as is the flow of granular material which is acting on the sidewall member 42. Accordingly, a relatively small amount of granular material is deflected by the convex surfaces of the vanes 62–68 and the sidewall member 42 and therefore the momentum absorbed by the vanes 62–68 which tends to oppose counterclockwise rotation of the base member 34 is relatively low.

As base member 34 rotates to the position shown in FIG. 8 (B), there is an increase in the flow of the granular material through the flow paths 94–98 while there is a decrease in flow of granular material through the flow paths 100 and 102. Because the amount of granular material flowing through the flow paths 94–98 increases, there is also a corresponding increase in the granular material flowing along the base member 34 which is deflected by the concaved surfaces of the arcuate portions 86–90 of the vanes 62–66 which have the greatest degree of curvature. Accordingly, the vanes 62–66 therefore absorb more momentum from the granular material which would otherwise tend to cause an increase in angular velocity of the base member 34 in the counterclockwise direction. However, there is also a corresponding increase in the amount of granular material deflected by the convex surfaces of the vanes 62–66 as well as by the sidewall member 42, both of which tend to oppose the counterclockwise rotation of the base member 34. As a result, the angular velocity of the base member 34 tends to remain substantially constant.

As the base member 34 continues to rotate to a position shown in FIG. 8 (C), the flow of granular material flowing through the flow paths 94 and 96 increases while there is a decrease in flow of granular material through the flow paths 98–102. Because the vanes 62–64, which establish the flow paths 94 and 96, have arcuate portions 86 and 88 with the highest degree of curvature, a relatively large amount of granular material is deflected by the concave surfaces of the vanes 62 and 64. While this would otherwise cause the angular velocity at which the base member 34 rotates to increase in the counterclockwise direction, there is also a corresponding increase in the amount of granular material acting on the sidewall member 42 as well as the convex surfaces of the vanes 62 and 64 which tends to oppose the counterclockwise rotation of the base member 34. Accordingly, the angular velocity of the base member 34 remains substantially constant.

Figure 8A:
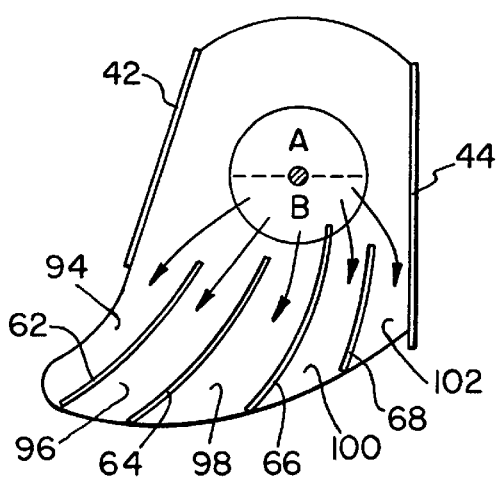
FIGS. 8 (A)–(F) are elevational views of the base member of the apparatus for distributing granular material shown in FIG. 4 illustrating the flow of granular material along the base member.
Figure 8B:
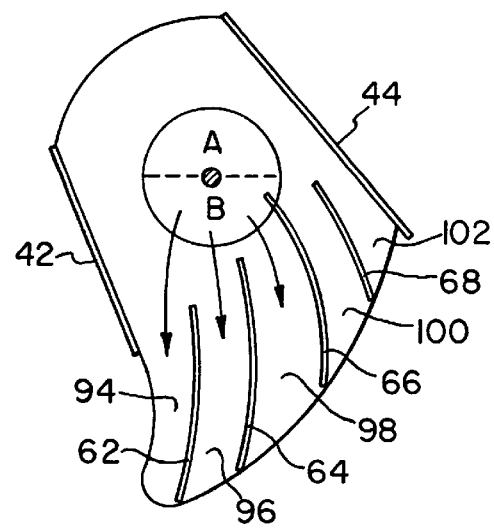
Figure 8C:
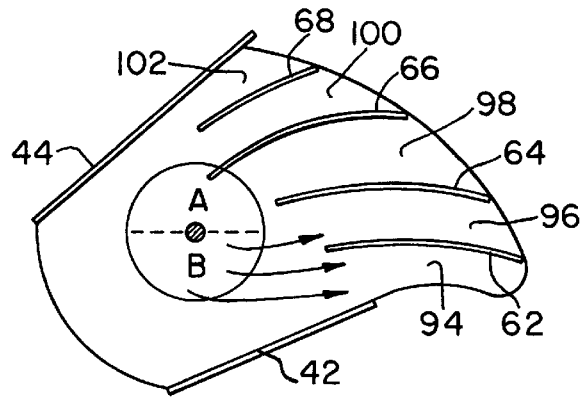
Figure 8D:
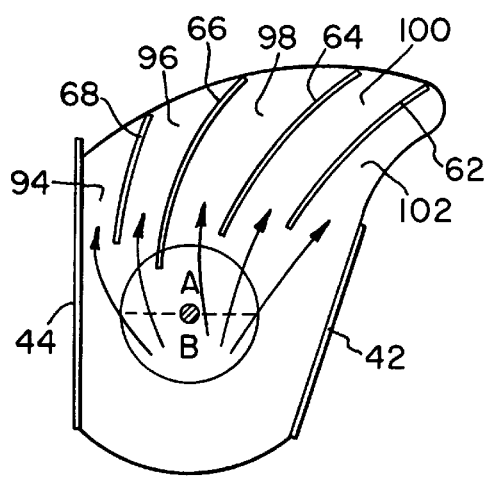

As the base member 34 is rotated further to a position shown in FIG. 8(D), the flow of granular material through the flow paths 94-102 is more evenly distributed when compared to the position of the base member 34 shown in FIG. 8 (C). Accordingly, the amount of granular material flowing through the flow paths 94 and 96 which are defined in part by the arcuate portions 86 and 88 which have the greatest curvature is reduced and therefore the momentum absorbed from the granular material by the concave surfaces of vanes 62 and 64 is reduced. While this would otherwise cause the angular velocity at which the base member 34 rotates to decrease in the counterclockwise direction, less granular material is also acting on the sidewall member 42 as well as the convex surfaces of the vanes 62 and 64. Accordingly, there is also a decrease in the forces which tend to oppose counterclockwise rotation of the base member 34. As a result, the base member 34 rotates at a substantially constant angular velocity.

Figure 8E:
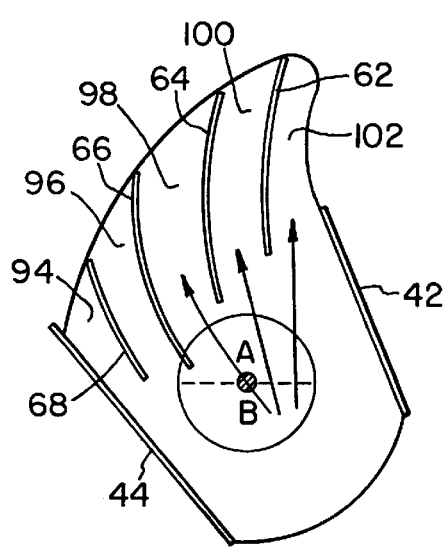
Figure 8F:
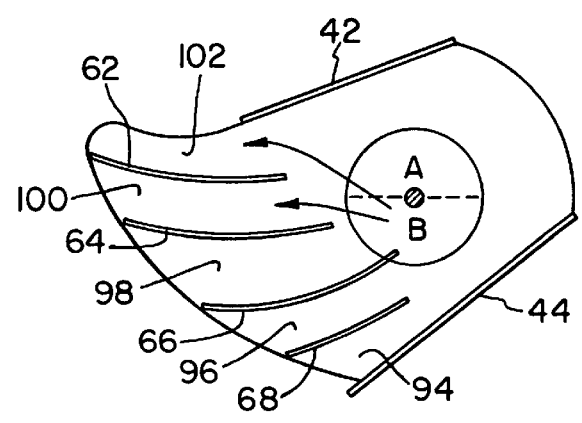

As the base member 34 rotates into a position shown in FIG. 8(E), the amount of granular material flowing through the flow paths 94–98 again increases. Accordingly, the momentum which is absorbed by the concaved surfaces of the vanes 62–66 tends to increase the angular velocity at which the base member 34 rotates in the counterclockwise direction. However, there is also a corresponding increase in the amount of momentum absorbed by the sidewall member 42 as well as by the convex surface of the vanes 62–66 which tends to oppose rotation of the base member in the counterclockwise direction. As a result, there is substantially no change in the angular velocity at which the base member 34 rotates. After the base member 34 rotates to the position shown in FIG. 8(F), the flow of granular material through the flow paths 94 and 96 increases which increases the momentum absorbed by the concave surfaces of the vanes 62 and 64. At the same time, there is an increase in the amount of granular material acting on the sidewall member 42 as well as on the convex surface of the vanes 62 and 64. Accordingly, the angular velocity at which the base member 34 rotates remains substantially uniform.

The method of the present invention will now be described. Initially, the base member 34 is formed having vanes 62–68 which create the flow paths 94–102 for the inflow of a granular material. The flow of granular material through the flow paths 94–102 causes the vanes 62–68 to absorb momentum from the granular material which induces base member 34 to rotate. The flow of the granular material through each of the flow paths 94–102 is then changed while the base member 34 rotates which causes a change in the momentum which is absorbed by the vanes 62–68. As a result of this change in the momentum which is absorbed by the vanes 62–68, the base member 34 rotates at a substantially uniform angular velocity.

Figure 9:
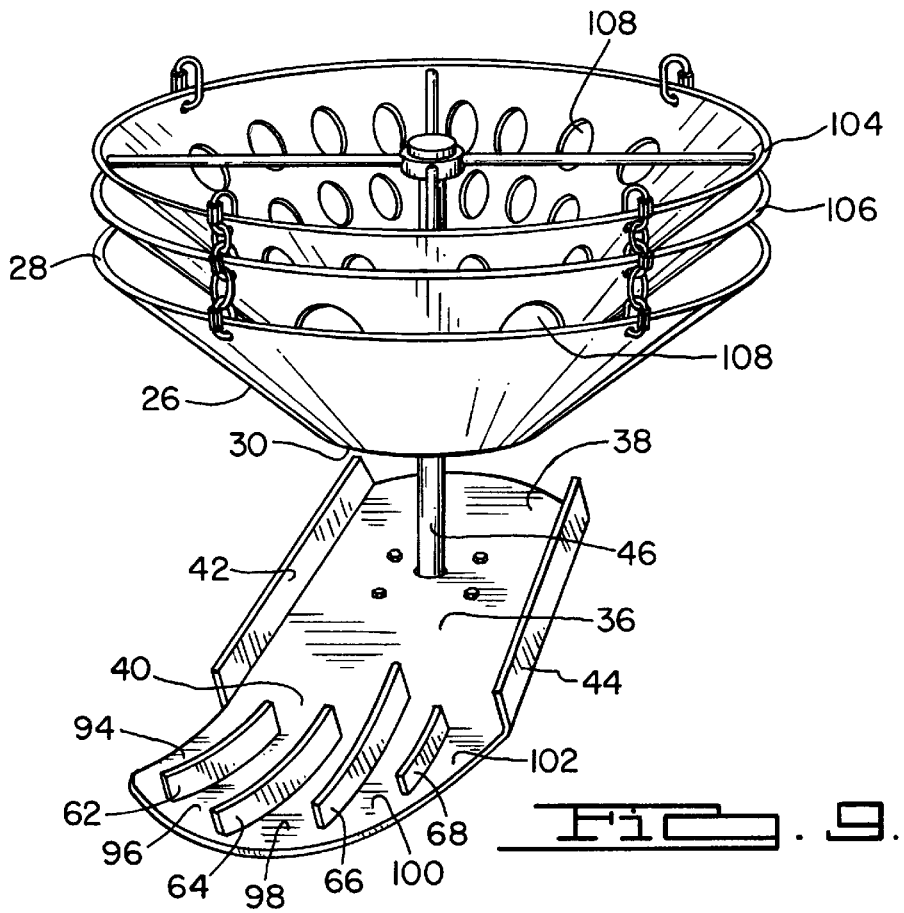
FIG. 9 is a perspective view of the apparatus for distributing granular material according to the teachings of another preferred embodiment of the present invention.

The second preferred embodiment of the present invention will now be described with reference FIG. 9. In this regard, like numerals will be used to reference similar elements which have been described in conjunction with the first preferred embodiment of the present invention. The apparatus 10 includes a conical member 26 which is operable to receive an inflow of granular material from a dispensing device 14. The conical member 26 is connected to a region of the cover portion 18 which is approximate to the open end 16 of the container 12 by a plurality of mechanical linkages 32. The apparatus 10 further includes a base member 34 which receives the inflow of granular material from the conical member 26 and distributes the constituents granular material in a substantially uniform manner within the container 12. The base member 34 has a plurality of vanes 62–68, which are operable to form a plurality of flow paths 94–102, as well as first and second sidewall members 42 and 44 which serve to guide the flow of granular material along the base member 34 to the lower end portion 40 of the base member 34. In addition, the apparatus 10 further includes a base support member 46 which extends downwardly from the conical member 26 to the base member 34 and is used to support the base member 34 within the container 12.

To provide means for directing the inflow of the granular material into the conical member 26, the apparatus 10 further includes a first apertured conical member 104 and a second apertured conical member 106. The first and second apertured conical members 104 and 106 are disposed coaxially with respect to each other as well as with respect to the conical member 26. The first and second apertured conical members 104 and 106 each include a plurality of apertures 108 which are located such that the apertures 108 in the first apertured conical member 104 are laterally displaced with respect to the apertures 108 in the second apertured conical member 106. The apertures 108 in the first and second apertured conical members 104 and 106 disburse the inflow of granular material into the apparatus 10 so that the inflow is received more evenly by conical member 26.

Figure 10:
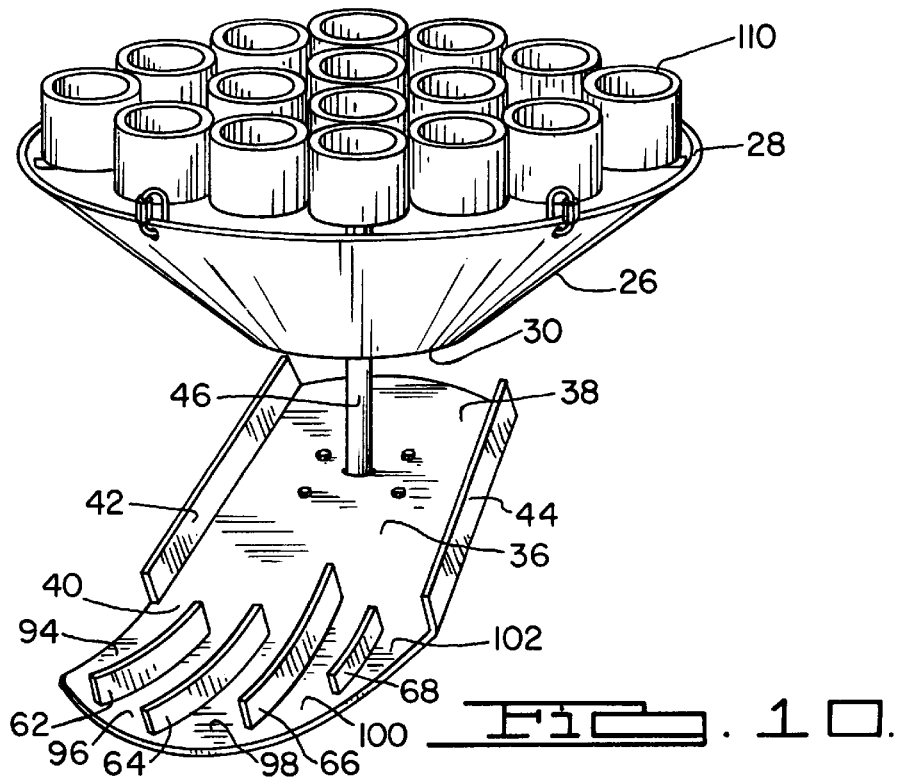
FIG. 10 is a perspective view of an apparatus for distributing granular material according to the teachings of yet another preferred embodiment of the present invention.

Another preferred embodiment of the present invention is shown in FIG. 10. In this regard, like reference numerals are used to identify similar structures. The apparatus 10 includes a conical member 26 which is operable to receive an inflow of granular material from a dispensing device 14, and is connected to the region of the cover portion 18 which is approximate to the open end 16 of the container 12 by a plurality of mechanical linkages 32. The apparatus 10 further includes a base member 34 which receives the inflow of granular material from the conical member 26 and distributes the constituents of the granular material in a substantially uniformly within the container 12. The base member 34 has a plurality of vanes 62–68 which are operable to form a plurality of flow paths 94–102, as well as first and second sidewall members 42 and 44 which serve to guide the flow of granular material along the base member 34 to the lower end portion 40 of the base member 34. In addition, the apparatus 10 further includes a base support member 46 which extends downwardly from the conical member 26 to the base member 34 and is used to support the base member 34 within the container 12.

The apparatus 10 further includes a plurality of tubular members 110. The tubular members 110 are disposed on the upper portion 28 of the conical member 26 and have apertures 112 which extend vertically. The tubular members 110 serve to receive an inflow of granular material and channel the granular material into the conical member 26. By channeling the granular material in this manner, the inflow of granular material is received more evenly by the conical member 26.

Figure 11:
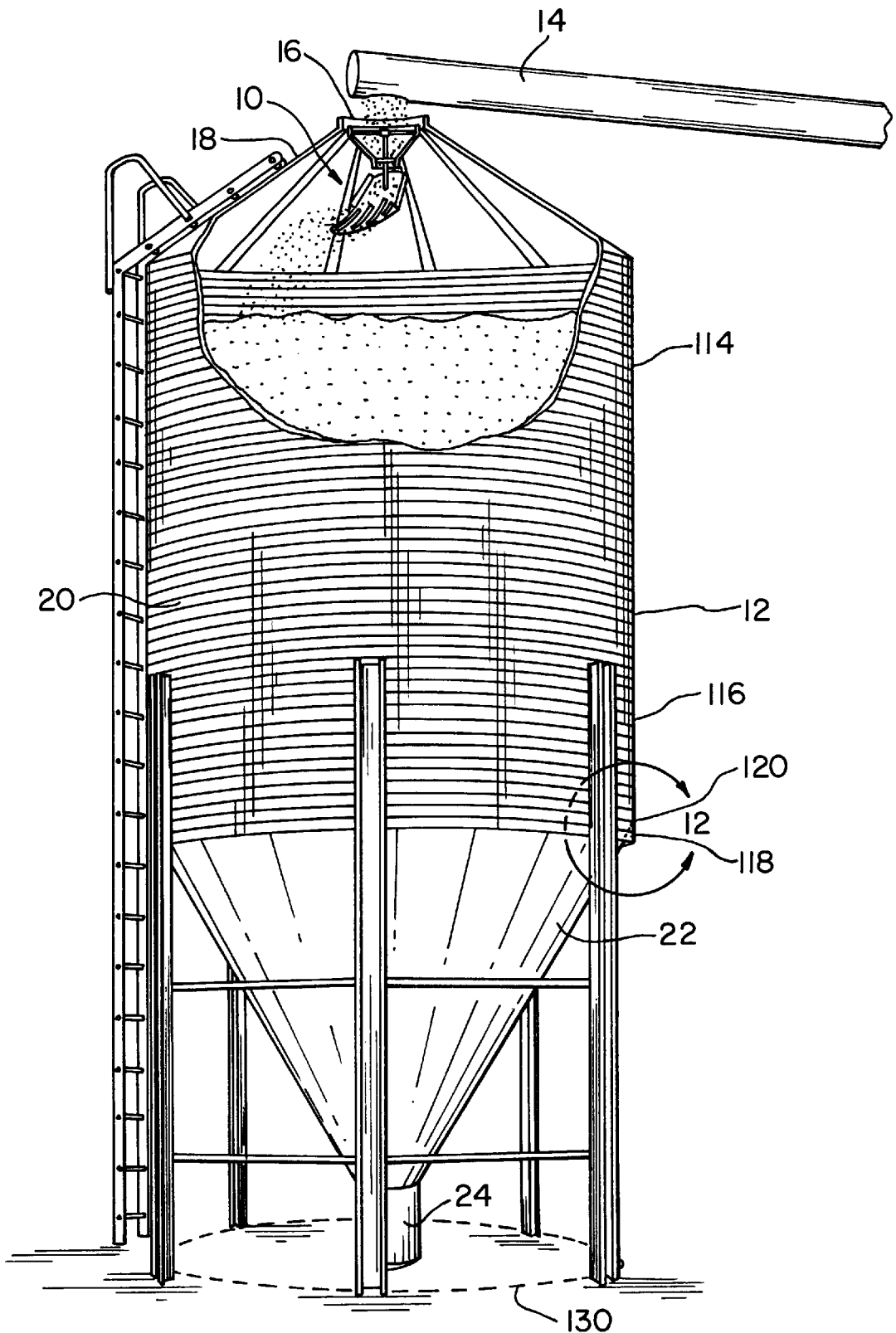
FIG. 11 is a perspective view, partially broken away, of a container having an apparatus for diverting the flow of rain according to the teachings of one preferred embodiment of the present invention.
Figure 12:
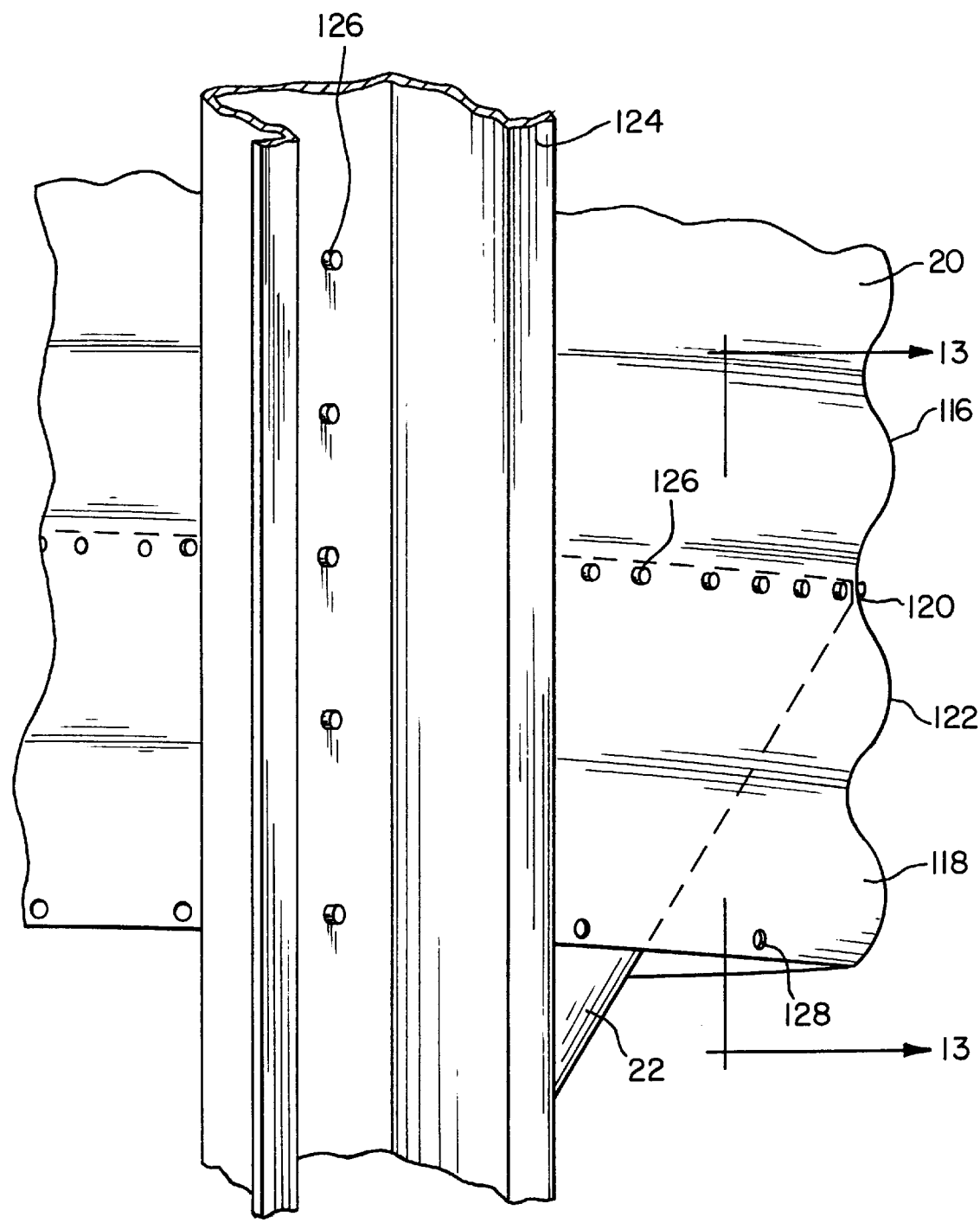
FIG. 12 is an enlarged perspective view of the apparatus for diverting the flow of rain as shown in FIG. 11 taken about line 12 in FIG. 11.
Figure 13:
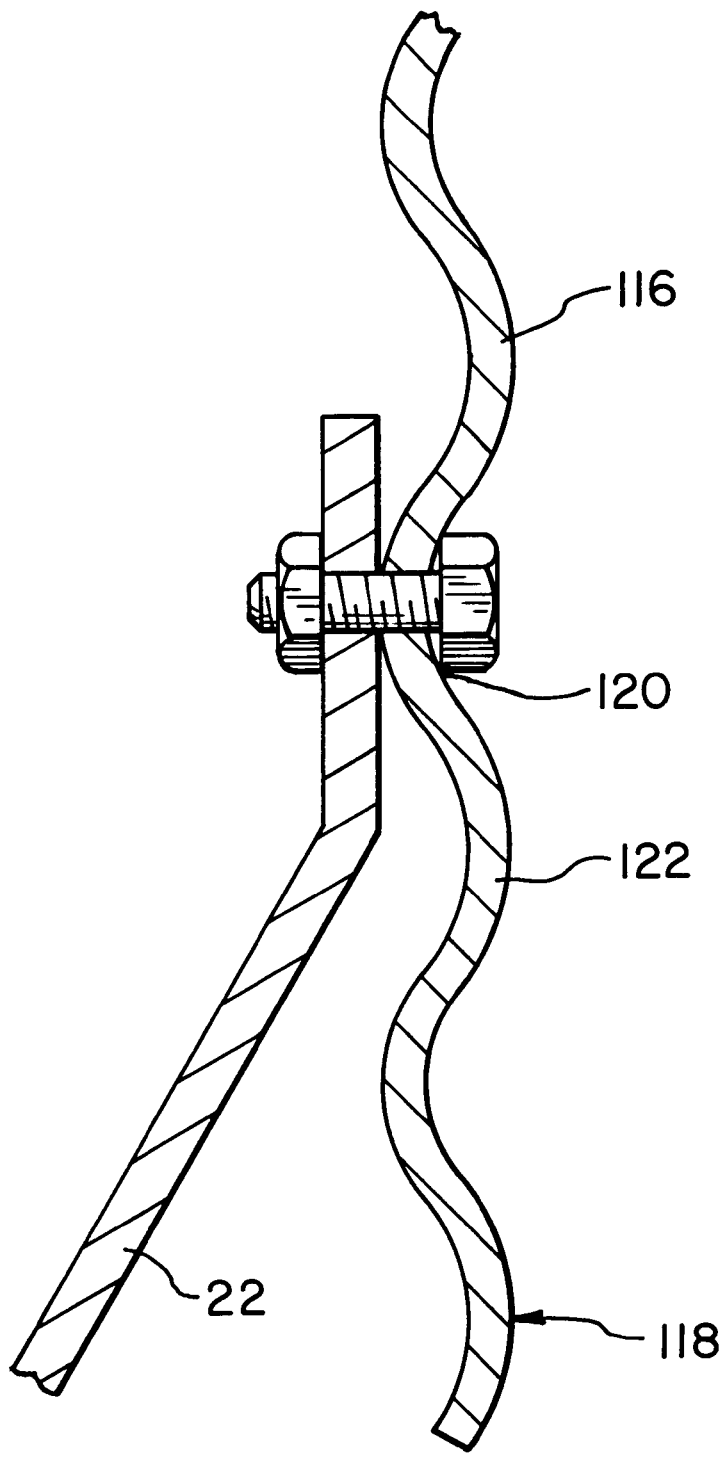
FIG. 13 is a cross-sectional view of the apparatus for diverting the flow of rain as shown in FIGS. 11–12 taken along line 13—13 in FIG. 12.

Turning to FIGS. 11–13, another preferred embodiment of the present invention is shown. In this regard, like reference numerals are used to identify similar structures. As was previously discussed, the spreader apparatus 10 is used to distribute grains, feed or food products or other materials into the container 12. The container 12 receives the inflow of material from the dispensing device 14 through the open end 16 of the container 12. The inflow of the material from the dispensing device 14 to the container 12 has a given momentum which allows distribution of the granular material about the inside of the container 12, via apparatus 10.

The container 12 includes the upper cover portion 18 which covers the granular material received within the container 12, as well as the tubular-shaped sidewall member 20 which confines the granular material received by the container 12. The sidewall member 20 includes an upper portion 114 attached to the cover portion 18 and a lower portion 116. The lower portion 116 is attached to the lower funnel-shaped or converging portion 22 which guides the granular material into the lower outlet portion 24.

The container 12 further includes a water shield member 118 which extends down from the lower portion 116 of the sidewall member 20. The water shield member 118 preferably extends about two (2") inches to about four (4") inches down from a point 120 where the lower portion 116 of the sidewall member 20 attaches to the funnel-shaped portion 22. The sidewall member 20, as well as the water shield member 118, is constructed from a galvanized metal having a plurality of corrugated ribs 122, shown more clearly in FIGS. 12–13. The water shield member 118 can consist of an integral extension of the sidewall member 20 or it can consist of a separate member which is bolted or riveted to the sidewall member 20. The water shield member 118, as shown in FIGS. 12–13, is integral to the sidewall member 20 which is bolted to the funnel-shaped portion 22 and support beam 124 with bolts 126. The water shield member 118 includes attachment holes 128 which allow attachment of additional extension members (not shown) which may be used to provide a further extension of the sidewall member 20. Such additional extension members may be used to provide a more aesthetically pleasing container 12 or to provide additional deflection for the flow of rain, as will be discussed shortly.

It will be appreciated by those skilled in the art that during a rainfall, rain will flow down the sidewall member 20 and the water shield member 118. This will ultimately cause the rain to be distributed about a base perimeter 130 of the container 12. Thus, the presence of the water shield member 118 substantially inhibits or prevents the flow of rain along and down the funnel-shaped portion 22 into the lower outlet portion 24, thereby maintaining the funnel-shaped portion 22 and the lower outlet portion 24 in a substantially dry condition during the rainfall. In contrast, in a conventional container 12 without the water shield member 118, the flow of rain would be directed from the cover 18 along the sidewall member 20 and then down along the funnel-shaped portion 22 converging the flow of rain at the lower outlet portion 24.

The method for storing the granular material in the container 12 which is exposed to various weather conditions, including rain, will now be described. Initially, the container 12 is formed having the cover portion 18 attached to the upper portion 114 of the sidewall member 20 and the funnel-shaped portion 22 attached to the lower portion 116 of the sidewall member 20. The funnel-shaped portion 22 guides the granular material to the outlet portion 24 and the rain shielding member 118 substantially inhibits the flow of rain along the funnel-shaped portion 22. Once the container 12 is formed, the container 12 is susceptible to being exposed to various weather conditions, including rain. If it begins to rain, the rain will impact upon the cover portion 18, as well as the sidewall member 20, and flow downward along the sidewall member 20. As the rain flows downward, it is deflected away from the funnel-shaped portion 22 to maintain the underside of container 12 in a substantially dry condition.

Referring to FIGS. 14–17, two particular lower outlet portions 24, generally known as boot and auger assemblies, have been used for removing granular material from within the container 12. The boot and auger assembly 140, as shown in FIG. 14, is fixedly secured to the lower funnel-shaped portion or hopper bin 22 by means of a circular reinforced collar 142. The collar 142 includes a conical sidewall portion 144 which is bolted to the inside of the lower funnel-shaped portion 22 with bolts 146. The collar 142 further includes a first cylindrical sidewall portion 148 having a diameter of about 16 inches or about 25 inches which tapers out to about 17.5 inches or about 26.5 inches at a second cylindrical sidewall portion 150. The boot and auger assembly 140 is fixedly secured to the second cylindrical portion 150 by means of bolts 152. The larger diameter of the second cylindrical portion 150 provides clearance for the thickness of the boot and auger assembly 140, as well as the bolts 152. In this way, as the granular material or grain 154 passes along the inside of the container 12 and through the collar 142, the grain 154 passes through the 16 inch diameter cylindrical portion 148 and is not restricted as it enters into the boot and auger assembly 140.

The boot and auger assembly 140 includes an upper boot portion 156, a slide/shutoff transition portion 158 and a lower or auger boot portion 160. The upper boot portion 156 includes a cylindrical lip 162 of about 1.5 inches in height which is secured to the collar 142 by bolts 152. The upper boot portion 156 is generally an irregular conical shape (see FIG. 15) which tapers to the rectangular slide/shutoff transition portion 158. The slide/shutoff transition portion 158 is about 0.75 inches in height and defines an opening 164 of about six inches by ten inches which is sealed or closed by a closure mechanism 166. The closure mechanism 166 includes a slide plate 168 which generally slides from the right to the left in a groove or track 170 to release the grain 154 into the lower boot portion 160. The slide plate 168 includes a chain 172 having a handle 174 which is utilized to pull the slide plate 168 along the groove or track 170.

The lower boot portion 160 includes a first angled baffle 176 and a second angled baffle 178 each secured to the inside of the lower boot portion 160 by means of bolts 180. The lower boot portion 160 further includes a side access panel 182 to permit access to the lower boot portion 160 should maintenance be required in this area. Located within the bottom of the lower boot portion 160 is an auger tube assembly 184. The auger tube assembly 184 may be an auger tube assembly of the type which is available from Chore-Time or Brock, Milford, Ind., known as a Chore-Time Flex-Auger which range in diameter from about one-and-one-half inches to four inches. The auger tube assembly 184 includes a centerless auger 186, a restrictor tube 188, and an anchor bearing assembly 190. The centerless auger 186 is rotatably secured by the anchor bearing assembly 190, while the restrictor tube 188 is rigidly secured in the center of the centerless auger 186 by the anchor bearing assembly 190. The restrictor tube 188 restricts the amount of granular material 154 that can be fed into the auger tube assembly 184, such that an output tube 192 is filled only to about 60% to 80% full. It should further be noted that a twin auger assembly may also be used in place of the single auger tube assembly 184.

As the centerless auger 186 is rotated in a clockwise manner, an agitating ball or cannon ball 194 vibrates or bounces within the lower boot portion 160 above an opening 196. With the slide plate 166 either opened partially, as shown in FIG. 15, creating an opening 198, or opened fully, the grain 154 enters and fills the lower boot portion 160. As the centerless auger 186 continues rotation clockwise, the agitating ball 194 bounces substantially along the second angled baffle 178, causing the grain 154 to generally flow along the first angled baffle 176 and into the centerless auger 186. Since the centerless auger 186 rotates clockwise, openings in the centerless auger 186 occur from the right to the left, and the flow of the grain 154 is also predominantly drawn from the right. In other words, as the centerless auger 186 fills up with the grain 154 and is rotated in a clockwise manner, the exposed portions of the centerless auger 186 or the open portions to receive additional grain is always positioned on the right side of the opening 196 creating a higher velocity flow of grain 154 coming down the right side of the container 12.

The flow pattern of the grain 154 is generally unevenly distributed within the container 12, with the higher velocity flow, designated as reference numeral 200, predominantly located on the right of the upper boot portion 156 and a slower velocity flow or static portion of grain 154, designated by reference numeral 202, positioned along the left wall of the upper boot portion 156 creating a transition region 204. If the angled baffles 176 and 178 are removed, this condition is further magnified since the unfilled openings in the centerless auger 186 are now located further to the right. Moreover, should a twin auger assembly be utilized and only one of the augers is rotated, this may also increase side unloading as the grain 154 passes through the opening 164. As the grain 154 is removed from the container 12, this uneven and non-uniform mass flow of grain 154 at the upper boot portion 156 creates a side unloading condition, as shown in FIG. 18.

This side unloading is also a significant problem when what is known as "slide management" is conducted. In other words, during slide management, multiple containers 12 are fluidly coupled together by a common auger tube assembly 184. In this way, there is a single terminal container 12 and multiple intermediate containers 12. Generally, the terminal container 12 will have its slide plate 168 fully opened, which will reduce the side unloading in the terminal container 12. However, the intermediate containers 12 will have their slide plates 168 only partially opened, as shown in FIG. 15, to maintain flow of the granular material 154 when the terminal container 12 empties. This causes and promotes side unloading in these intermediate containers 12, thereby making slide management with the existing systems not desirable.

The accumulated grain 154 in the container 12 will thus generally have a high wall 206 and a low wall 208 creating an angle which is generally about equal to the angle of repose of the granular material 154. For example, if the granular material 154 is chicken feed, the angle of repose will be about 40° to 45°. This side unloading condition creates extreme stresses upon the container 12 which may result in warpage of the collar 142 and may even create stress cracks or fractures within the lower funnel-shaped portion 22. Over time, the overall shape of the container 12 may also be affected and warped. In addition, should the flow of grain 154 be from the left to the right, the side unloading would be simply reversed, as from that shown in FIG. 18.

A second boot and auger assembly 210 which has also been used for removing grain 154 within the container 12 is shown. In this regard, like reference numerals are used to identify similar structures. The boot and auger assembly 210 is essentially identical to the boot and auger assembly 140 in that it includes the upper boot portion 156, the slide/shutoff transition portion 158, and the lower boot portion 160. The only difference in the boot and auger assembly 210 is the addition of a wedge portion 212 which causes the auger tube assembly 184 to be angled upward or clockwise by about 30°, designated by reference numeral 214. The wedge portion 212 may have an angle anywhere from about 0° to 30° relative to a horizontal plane depending on the particular requirements for transporting the grain 154. The angled auger tube assembly 184 enables the grain 154 to be moved upward into buildings or other storage facilities as may generally be required. An additional angled elbow may also be coupled adjacent to the output tube 192 which may angle from about 0° to 30° relative to the axial plane of the auger tube assembly 184, providing a total angle of lift between about 0° to 60°.

Here again, the boot and auger assembly 210 exhibits the same deficiencies as exhibited in the boot and auger assembly 140. In other words, the grain 154 also flows unevenly and non-uniformly within the container 12. Specifically, with the slide plate 168 either opened partially or fully, the grain 154 fills the lower boot portion 160 along a baffle 216 and a side wall 218. The agitating ball 194 agitates or bounces along an alignment plate 220 to substantially expose an opening 222. As the centerless auger 186 is rotated in a clockwise manner, the centerless auger 186 fills from the right to the left, thereby causing the grain 154 to have an uneven or non-uniform mass flow within the container 12. The grain 154 will have the higher velocity flow 200 and the slower velocity flow or static flow 202 creating the transition region 204 passing through the upper boot portion 156. This further generates the side unloading condition, as shown in FIG. 18. Moreover, by including the angled wedge portion 212, this may magnify and create an even sharper angle of side unloading since the opening 222 is positioned further to the right of the lower boot portion 160.

Turning now to FIGS. 19–22, two additional preferred embodiments of the present invention are shown which are directed to a method and apparatus for maintaining a substantially uniform mass flow of granular material 154 out of the container 12 which is preferably an agricultural bin container 12. In this regard, like reference numerals are used to identify similar structures. A boot and auger assembly 224 according to a first preferred embodiment of the present invention is shown in FIGS. 19–20. The boot and auger assembly 224 is fixedly secured to the lower funnel-shaped portion 22 of the container 12 by means of the collar 142, bolts 146, and bolts 152. The boot and auger assembly 224 includes an upper boot portion 226, a slide/shutoff transition portion 228 and a lower or auger boot portion 230. The upper boot portion 226 includes a cylindrical lip 228 having a height of about 1.5 inches which is fixedly secured to the collar 142 by bolts 152. The upper boot portion 226 further includes a conical or converging transition portion 232 and a cylindrical chimney portion 234.

The conical transition portion 232 and the chimney portion 234 may be comprised of a transparent polymeric material or may include a polymeric portion and a steel portion. The conical transition portion 232 has about a 52° included angle, or about a 26° angle relative to the vertical plane, or an angle of about 64° relative to the horizontal plane identified by reference numeral 236. Should additional clearance be required in the area, the angle of the conical transition portion 232 may be adjusted accordingly. The entrance to the conical transition portion 232 is defined by a circular input opening 238 having a diameter of about 17.5 inches or about 26.5 inches which tapers to a circular output opening 240 having a diameter or transverse opening dimension of about 4.75 inches that is coupled to the cylindrical chimney portion 234. The cylindrical chimney portion 234 maintains the 4.75 inch diameter and has a height also of about 4.75 inches, where the diameter (x) is identified by reference numeral 242 and the height (y) is identified by reference numeral 244. This provides a ratio of about 1:1 for the circular diameter 242 of the exit opening 240 relative to the height 244 of the cylindrical chimney 234 (i.e. (x)=(y)).

Here again, the slide/shutoff transition portion 228 includes the closure mechanism 166 having the slide plate 168, chain 172, and handle 174 which, when pulled, slides in the track 170 to expose the lower boot portion 230 to the grain 154. Positioned in the lower boot portion 230 are a pair of symmetric baffles 246 which guide the grain 154 to an opening 248. The baffles 246 are secured within the lower boot portion 230 by means of bolts 250 and have an angle of about 40° relative to the horizontal plane. It should further be noted that the baffles 246 may also be eliminated to expose the entire centerless auger 186 in the lower boot 230. Located at the lower-most portion of the lower boot portion 230 is the auger tube assembly 184 having the centerless auger 186, the restrictor tube 188, and the anchor bearing assembly 190. The centerless auger 186 is rotatably secured and the restrictor tube 188 is fixedly secured relative to the anchor bearing assembly 190.

The method for maintaining a uniform mass flow of granular material 154 out of the container 12, will now be described with reference to FIGS. 19, 20, and 22. Initially, the container 12 is evenly filled with the granular material 154 by use of the filling apparatus 10. Once the container 12 has been filled with the granular material 154 and it is desired to remove the granular material 154 from the container 12, the slide plate 168 is slid open along the groove 170 utilizing the handle 174 and chain 172. The slide plate 168 may either be only partially opened to expose an opening 252, as will generally occur during what is known as "slide management", or fully opened. With the slide plate 168 opened, the centerless auger 186 is rotated in a clockwise manner utilizing a motor remote from the auger tube assembly 184. As the centerless auger 186 is rotated in the clockwise manner, the grain 154 begins to flow out of the output tube 192 to a desired location through additional conventional tubes enclosing the centerless auger 186 (not shown).

In order for the grain 154 to have a uniform and even mass flow throughout substantially the entire container 12, wherein the first grain in is the first grain out (i.e. first in/first out), there must be a substantially uniform mass flow at the circular input opening 238 or circular output opening 240 of the boot and auger assembly 224. With a substantially uniform mass flow, the top 254 of the feed column 256 in the container 12 substantially maintains its fill pattern having generally an angle of repose at the top 254 of the feed column 256, as shown in FIG. 22. For example, with chicken feed having an angle of repose, or natural piling tendency, of about 40° to 45°, the angle at the top 254 of the feed column 256 will have substantially the angle of repose relative to the horizontal plane, which is also substantially parallel with the cover portion 18.

To create and maintain this substantially uniform mass flow out of the container 12 for a moderately flowing granular material 154, the circular output opening 240 having diameter 242 should be about the same as the height 244 of the cylindrical chimney 234. In this manner, a ratio of about 1:1 for the diameter 242 versus the height 244 should be maintained, if the angle of repose of the granular material 154 is about 40° to 45°. In other words, a flow pattern is achieved in the cylindrical chimney portion 234 such that as the grain 154 is fed from the right to the left with the centerless auger 186, a right to left mass flow 258 begins within the chimney portion 234. A slower mass flow or static flow of grain 260 is then positioned from the left to the right in the chimney portion 234 creating a transition region 262 having an angle 264 which is substantially similar to the angle of repose of the granular material 154.

For example, should the granular material 154 be chicken feed which has an angle of repose of approximately 40° to 45°, the transition region 262 will have an angle 264 of about 40° to 45° formed within the cylindrical chimney portion 234. This angle 264 at transition region 262 enables the circular output opening 240 to be filled substantially across the entire diameter or transverse opening dimension 242 with the higher velocity right to left mass flow 258. This uniform mass flow 258 at the circular output opening 240 is magnified and transferred upward throughout the container 12, creating the substantially uniform mass flow in the container 12, as shown in FIG. 22. In this way, a uniform mass flow may be achieved with the slide plate 168 open partially, during slide management, as shown in FIG. 20, or when the slide plate 168 is fully opened. In other words, the intermediate containers 12 may have their slide plates 168 only partially opened 252, as shown in FIG. 20, without causing a side unloading condition in the intermediate containers 12, as would occur with existing systems. This makes it possible and desirable to conduct slide management without creating a side unloading condition in any of the containers 12 including the intermediate containers 12. Should a coarser granular material 154 be utilized which may have a coarser angle of repose, such as about 20° to 30°, the ratio of the diameter 242 of the circular output opening 240 relative to the height 244 of the cylindrical chimney 234 can be changed as a function of the angle of repose of this coarser material. In other words, the transition region 262 would have a shallower angle 264, thereby enabling the height 244 of the cylindrical chimney 234 to be reduced while maintaining the diameter 242 of the outlet opening 240.

Specifically, with a 30° angle 246 of repose and a diameter 242 of about 4.75 inches, the height 244 would need to be about 2.74 inches using known trigonometric properties. Thus, a ratio of 4.75 to 2.74 or 1.73 to 1 (1.73:1) of the diameter 242 relative to the height 244 would be required. Accordingly, the ratio of the diameter 242 relative to the height 244 is determined and selected to produce a transition region 262 having an angle 264 which is about the same as the angle of repose for the particular granular material 154 used. More particularly, if diameter or transverse opening diameter 242 is (x), height dimension 244 is (y), and the angle 264 of repose is θ, you have:

$$\text{Tan } \theta = y/x.$$

Solving for θ yields: $\theta = \text{Tan}^{-1} y/x$.

Therefore, the inverse tangent of the height (y) divided by the diameter (x) should be about the same as the angle of repose (e) for the particular granular material 154 selected. This will provide for a substantially uniform mass flow of granular material 154 from the output opening 240 upward through the container 12 as the granular material 154 is removed from the container 12.

Moreover, it should be noted that the diameter 242 of the output opening 240 will first be selected depending on the mass flow desired and on the density of the granular material 154. For example, the 4.75 inch diameter 242 of the output opening 240 will provide up to about 600 pounds per minute (lbs./min.) of free flow through the output opening 240 for a granular material 154 having a density of about 40 pounds per cubic foot (lbs./ft$^3$), which is generally the density of chicken feed. Should a slower or faster mass flow be desired, the diameter 242 can be adjusted accordingly. For instance, a six inch diameter 242 at output opening 240 will have a free flow of about 1000–1100 pounds per minute at a density of about 40 pounds per cubic foot. This mass flow will generally be adjusted to meet the desired flow rate of the auger tube assembly 184. Once the diameter 242 is selected, the height 244 of the chimney 234 is then determined based upon the angle of repose of the granular material 154 selected. This is done by using the equation Tan θ=y/x, where x (diameter 242) and θ (angle of repose) are known, and y (height 244) can be solved for from this equation.

Turning to FIG. 21, a second preferred embodiment of a boot and auger assembly 266 of the present invention is shown. In this regard, like reference numerals will be used to describe the similar structures. The boot and auger assembly 266 is substantially similar to the boot and auger assembly 224 except that it includes a 30° wedge portion 268 positioned at a circular outlet opening 270 of the cylindrical chimney 234. The wedge portion 268 may range from 0° to 30° relative to a horizontal plane and an additional 0° to 30° elbow may be used adjacent to the output tube 192, shown in FIG. 17. The angled wedge portion 268 causes the auger tube assembly 184 to be angled upward at about 30°, thereby enabling the grain 154 to be transported upward into buildings or other like structures. In addition, the lower boot portion 230 includes a single angled baffle 272, secured via bolts 274, and an alignment plate 276, creating an opening 278 where the agitating ball 194 vibrates or bounces.

Here again, the boot and auger assembly 266 operates in a substantially similar manner as the boot and auger assembly 224 to create a substantially uniform mass flow of granular material 154 throughout the container 12 from the circular output opening 240 upwards. Should a coarser granular material 154 be utilized, the height 244 of the cylindrical chimney 234 can also be reduced while maintaining the diameter 242 of the output opening 240, due to a shallower angle 264 of the transition region 262. Conversely, should a slower flowing granular material 154 be used, the height 244 may be extended so that the height 244 is greater than the diameter 242. The substantially uniform mass flow creates the granular column 256 similar to that shown in FIG. 22.

Those skilled in the art can now appreciate from the foregoing description that the broad teachings of the present invention can be implemented in a variety of forms. Therefore, while this invention has been described in connection with particular examples thereof, the true scope of the invention should not be so limited. For example, the base member may be of other geometric structures which nevertheless serve to form a plurality of flow paths for the granular material. In this regard, the vanes may be of different shapes and configurations as may be the end portions of the base member. In addition, the orientation of the vanes on the base member may also vary. Furthermore, the base member may preferably rotate at an angular velocity of less then approximately 10 revolutions per minute, the base member may rotate at other angular velocities so long as distribution of the granular material is generally evenly and/or uniformly distributed within the container as described above. Moreover, the container may be of different shapes. For example, the container may be tubular, rectangular or octagonal. Other modifications will become apparent to those skilled in the art.

What is claimed is:

1. An apparatus for maintaining a substantially uniform mass flow of granular material out of a container, said apparatus comprising:

a converging transition portion defining an input opening which converges to an output opening, said output opening having a transverse opening dimension (x);

an elongated chimney portion coupled to said converging transition portion at said output opening, said elongated chimney portion having a height dimension (y), wherein a ratio of said transverse opening dimension (x) relative to said height dimension (y) is substantially determined by an angle of repose of the granular material to maintain a substantially uniform mass flow of the granular material; and a lower funnel-shaped portion and a rain shielding member extending from said container adjacent to said lower funnel-shaped portion to substantially inhibit the flow of rain on said lower funnel-shaped portion, said converging transition portion being fixedly secured to said lower funnel-shaped portion.

2. The apparatus as defined in claim 1 wherein said converging transition portion is a conical transition portion and said elongated chimney portion is an elongated cylindrical portion.

3. The apparatus as defined in claim 2 wherein said conical transition portion converges at an angle of about 64° relative to a horizontal plane and said transverse opening dimension (x) is about 4.75 inches and said height dimension (y) is about 4.75 inches.

4. The apparatus as defined in claim 1 wherein said converging transition portion and said elongated chimney portion are formed from a transparent material to enable observation of the granular material passing therethrough.

5. The apparatus as defined in claim 1 wherein said elongated chimney portion is an elongated cylindrical chimney coupled to said converging transition portion at a circular output opening.

6. The apparatus as defined in claim 1 wherein said transverse opening dimension (x) relative to said height dimension (y) has a ratio of about 1:1.

7. The apparatus as defined in claim 1 wherein an inverse tangent of said height dimension (y) divided by said transverse opening dimension (x) is an angle which is about the same as an angle of repose of the granular material.

8. The apparatus as defined in claim 1 further comprising a closure mechanism in fluid communication with said elongated chimney portion, wherein said closure member may be partially open during slide management of said closure mechanism without creating a side unloading of the granular material within the container.

9. An apparatus for maintaining a substantially uniform mass flow of a granular material having an angle of repose θ out of a container, said apparatus comprising:

a converging transition portion having a converging sidewall defining an input opening which converges to an output opening, said output opening having a transverse opening dimension (x);

an elongated chimney portion having an elongated sidewall coupled to said converging transition portion at said output opening, said elongated chimney portion having a height dimension (y), said transverse opening dimension (x) being sized relative to said height dimension (y), wherein an inverse tangent of said height dimension (y) divided by said transverse opening dimension (x) is about the same as the angle of repose θ of the granular material;

a closure member mechanically communicating with said elongated chimney and having an open and a closed position: and granular material disposed within said apparatus, said granular material having a substantially static flow region and a transition region in said elongated chimney portion, said transition region having an angle which is substantially similar to the angle of repose θ of the granular material when said closure member is disposed in said open position.

10. The apparatus as defined in claim 9 wherein said converging transition portion is a conical transition portion having a circular input opening and a circular output opening and said elongated chimney portion is an elongated cylindrical portion.

11. The apparatus as defined in claim 9 wherein said converging transition portion and said elongated chimney portion are formed from a transparent material to enable observation of the granular material passing therethrough.

12. The apparatus as defined in claim 9 wherein said container includes a lower funnel-shaped portion and a rain shielding member extending from said container adjacent to said lower funnel-shaped portion to substantially inhibit the flow of rain on said lower funnel-shaped portion, said converging transition portion being fixedly secured to said lower funnel-shaped portion.

13. The apparatus as defined in claim 9 wherein said transverse opening dimension (x) relative to said height dimension (y) has a ratio of about 1:1.

14. A method for maintaining a substantially uniform mass flow of granular material out of a container, said method comprising the steps of:
    determining a desired mass flow of the granular material;
    selecting an output opening above an elongated chimney portion having a transverse opening dimension (x) which provides the desired mass flow;
    determining an angle of repose of the granular material;
    selecting a height dimension (y) for the elongated chimney portion, wherein an inverse tangent of said height dimension (y) divided by said transverse opening dimension (x) is an angle which is about the same as the angle of repose of the granular material;
    filling the container with the granular material; and
    moving the granular material from the container through the elongated chimney portion to provide a substantially uniform mass flow of the granular material.

15. The method as defined in claim 14 further comprising the steps of:
    providing a terminal container and an intermediate container in fluid communication with one another;
    fully opening a first closure mechanism in the terminal container; and
    partially opening a second closure mechanism in the intermediate container, wherein a uniform mass flow of granular material occurs in the terminal container and the intermediate container without creating a side unloading of the granular material in the terminal container and the intermediate container.

16. The method as defined in claim 14 further comprising the step of selecting said height dimension (y) and said transverse opening dimension (x) to have a ratio of about 1:1.

17. The method as defined in claim 14 further comprising the step of selecting said elongated chimney portion from a transparent material to enable observation of the granular material passing therethrough.

18. A container for storing granular material, said container comprising:
    a cover portion operable to substantially cover the granular material stored in the container;
    a sidewall member having an upper portion and a lower portion, said upper portion of said sidewall member being attached to said cover portion, said sidewall member operable to confine the granular material stored in the container;
    a converging portion attached to said lower portion of said sidewall member, said converging portion being operable to guide the granular material in the container to an outlet in said converging portion;
    means, attached to said outlet of said converging portion, for maintaining a substantially uniform mass flow of granular material out of the container; and
    means for distributing said granular material in said container by absorbing momentum from an inflow of the granular material, said means for distributing the granular material including:
    (a) at least one orientable flow path defined by said means for distributing the granular material for directing said inflow of the granular material into said container, and
    (b) the orientation of said at least one flow path being changeable by absorbing momentum from the granular material by said means for distributing the granular material.

19. The container as defined in claim 18, wherein said means for maintaining a substantially uniform mass flow includes a conical transition portion defining an input opening which converges to an output opening and an elongated cylindrical chimney portion coupled to said conical transition portion at said output opening.

20. The container as defined in claim 19 wherein said output opening has a transverse opening dimension (x) and said elongated cylindrical chimney portion has a height dimension (y) wherein a ratio of said transverse opening dimension (x) relative to said height dimension (y) is substantially determined by an angle of repose of the granular material.

21. A method for generating a substantially uniform mass flow of granular material having an angle of repose out of a container, said method comprising:
    providing a converging transition portion having a converging sidewall that converges to an output opening having a transverse opening dimension (x) that substantially controls mass flow of the granular material out of the container determining the angle of repose of the granular material;
    providing an elongated chimney portion having a height dimension (y), where an inverse tangent of said height dimension (y) divided by said transverse opening dimension (x) is an angle which is about the same as the angle of repose of the granular material;
    coupling said elongated chimney portion to said converging transition portion;
    filling the container with the granular material; and
    moving the granular material from the container through the converging transition portion and the elongated chimney portion to provide a substantially uniform mass flow of the granular material.

22. The method as defined in claim 21 further comprising:
    providing a terminal container and an intermediate container in fluid communication with one another;
    fully opening a first closure mechanism in the terminal container; and
    partially opening a second closure mechanism in the intermediate container, wherein a uniform mass flow of granular material occurs in the terminal container and the intermediate container without creating a side unloading of the granular material in the terminal container and the intermediate container.

23. The method as defined in claim 21 further comprising selecting said elongated chimney portion from a transparent material to enable observation of the granular material passing therethrough.

* * * * *

UNITED STATES PATENT AND TRADEMARK OFFICE
CERTIFICATE OF CORRECTION

PATENT NO.    : 5,906,293
DATED         : May 25, 1999
INVENTOR(S)   : Richard L. Geiser et al.

It is certified that error appears in the above-identified patent and that said Letters Patent is hereby corrected as shown below:

<u>Column 6,</u>
Line 27, "28" should be -- 26 --.

<u>Column 18,</u>
Line 50, "(e)" should be --Ⓞ--

Signed and Sealed this

Eighteenth Day of June, 2002

*Attest:*

JAMES E. ROGAN
*Attesting Officer*   *Director of the United States Patent and Trademark Office*